US011898675B2

(12) United States Patent
Lu et al.

(10) Patent No.: US 11,898,675 B2
(45) Date of Patent: Feb. 13, 2024

(54) PIPE ELEMENT COUPLER AND COUPLING METHOD THEREOF

(71) Applicant: Shanghai Vision Mechanical Joint Co., Ltd., Shanghai (CN)

(72) Inventors: Zhigang Lu, Shanghai (CN); Zhibing Zhai, Shanghai (CN)

(73) Assignee: Shanghai Vision Mechanical Joint Co., Ltd., Shanghai (CN)

( * ) Notice: Subject to any disclaimer, the term of this patent is extended or adjusted under 35 U.S.C. 154(b) by 401 days.

(21) Appl. No.: 16/892,299

(22) Filed: Jun. 4, 2020

(65) Prior Publication Data

US 2020/0408341 A1 Dec. 31, 2020

Related U.S. Application Data

(63) Continuation of application No. 16/660,825, filed on Oct. 23, 2019, now Pat. No. 10,711,929.

(30) Foreign Application Priority Data

Jun. 29, 2019 (CN) .......................... 201910581107.2

(51) Int. Cl.
*F16L 37/08* (2006.01)
*F16L 17/04* (2006.01)
(Continued)

(52) U.S. Cl.
CPC .............. *F16L 37/082* (2013.01); *F16L 17/04* (2013.01); *F16L 21/005* (2013.01); *F16L 21/065* (2013.01)

(58) Field of Classification Search
CPC ......... F16L 37/082; F16L 23/08; F16L 23/10; F16L 17/04; F16L 21/065
See application file for complete search history.

(56) References Cited

U.S. PATENT DOCUMENTS 4,568,115 A * 2/1986 Zimmerly ............... F16L 23/10
285/411
4,915,418 A * 4/1990 Palatchy ................. F16L 17/04
285/411
(Continued)

FOREIGN PATENT DOCUMENTS

CN 2644836 Y 9/2004
CN 101175940 A 5/2008
(Continued)

OTHER PUBLICATIONS

Examination Report of Canadian Patent Application No. 3,143,862 dated Feb. 15, 2023.
(Continued)

*Primary Examiner* — David Bochna
(74) *Attorney, Agent, or Firm* — COOPER LEGAL GROUP, LLC

(57) ABSTRACT

A pipe element coupler includes a plurality of coupling members, a gasket disposed in the coupling members and a fastening element. Each of the coupling members includes two engaging keys at two coupling end portions thereof each having an engaging surface that has varying radiuses of curvature. The fastening element is coupled at the coupling members, wherein the pipe element coupler is adapted for being preassembled on the two pipe elements to align the engaging keys with the corresponding grooves of the pipe elements. When the fastening element is operated to fasten the coupling members together, each of the engaging surfaces is deformed to change the varying radiuses of curvature, so as to substantially match a radius of curvature of the groove circumference at the bottom of the groove of the pipe element.

20 Claims, 14 Drawing Sheets

(51) Int. Cl.
*F16L 21/00* (2006.01)
*F16L 21/06* (2006.01)

(56) References Cited

U.S. PATENT DOCUMENTS

| | | | |
|---|---|---|---|
| 10,711,929 B1* | 7/2020 | Lu | F16L 17/04 |
| 2005/0253029 A1 | 11/2005 | Gibb et al. | |
| 2005/0253383 A1* | 11/2005 | Gibb | F16L 17/04 |
| | | | 285/112 |
| 2008/0007061 A1 | 1/2008 | Gibb et al. | |
| 2009/0223031 A1* | 9/2009 | Gibb | F16L 23/08 |
| | | | 29/513 |
| 2012/0256415 A1 | 10/2012 | Dole | |
| 2012/0256416 A1* | 10/2012 | Ikeda | F16L 17/04 |
| | | | 285/365 |
| 2013/0185919 A1* | 7/2013 | Beagen, Jr. | F16L 17/04 |
| | | | 285/337 |
| 2018/0163906 A1 | 6/2018 | Ohnemus et al. | |
| 2020/0088330 A1* | 3/2020 | Lippka | F16L 17/04 |

FOREIGN PATENT DOCUMENTS

| | | |
|---|---|---|
| CN | 102597591 A | 7/2012 |
| CN | 104204640 A | 12/2014 |
| CN | 104930273 A | 9/2015 |
| CN | 204879161 U | 12/2015 |
| CN | 109442108 A | 3/2019 |
| EP | 2112414 A1 | 10/2009 |
| EP | 3988830 A1 | 4/2022 |
| JP | S52146718 U | 11/1977 |
| JP | 2001003459 A | 1/2001 |
| JP | 2007537414 A | 12/2007 |
| JP | 2008032212 A | 2/2008 |
| JP | 2008032213 A | 2/2008 |
| JP | 2015072070 A | 4/2015 |
| KR | 101244771 B1 | 3/2013 |
| WO | 2007/145995 A2 | 12/2007 |
| WO | 2008012893 A1 | 1/2008 |
| WO | 2021000834 A1 | 1/2021 |

OTHER PUBLICATIONS

Official Communication of European Patent Application No. 20835021.5 dated Aug. 5, 2022.
Examination Report of Indian Application No. 202137060064 dated Aug. 25, 2022.
European Search Report of European Patent Application No. 20835021.5 dated Jul. 25, 2022.
Australian Examination Report for Corresponding Application No. 2020462733; dated May 31, 2023; 5 Pgs.

\* cited by examiner

A-A

| Specification (mm) | Range of θ | Specification (mm) | Range of θ |
|---|---|---|---|
| 60.3 | 0-169.88° | 139.7 | 0-175.02° |
| 73.0 | 0-170.67° | 141.3 | 0-175.05° |
| 76.1 | 0-171.23° | 159.0 | 0-175.57° |
| 88.9 | 0-172.46° | 165.1 | 0-175.68° |
| 108.0 | 0-173.53° | 168.3 | 0-175.76° |
| 114.3 | 0-173.92° | 216.3 | 0-175.42° |
| 133.0 | 0-174.84° | 219.1 | 0-175.47° |

| Sp(mm) | Range of θ | | Minor axis (mm) | Major axis (mm) |
|---|---|---|---|---|
| | Ellipse curve | logarithmic spiral curve | | |
| 33.7 | -60-60° | 60-196.64° | 30.23 | 34.0 |
| 42.4 | -60-60° | 60-166.02° | 38.99 | 43.0 |
| 48.3 | -60-60° | 60-153.0° | 45.09 | 49.0 |

PIPE ELEMENT COUPLER AND COUPLING METHOD THEREOF

CROSS REFERENCE OF RELATED APPLICATION

This is a Continuation application that claims the benefit of priority under 35 U.S.C. § 120 to a U.S. patent no. U.S. Ser. No. 10/711,929B1, filed Oct. 23, 2019, and the benefit of priority under 35 U.S.C. § 119 to Chinese application number CN 201910581107.2, filed Jun. 29, 2019, the entire contents of each of which are expressly incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a coupling device for pipe elements, and more particularly to a pipe element coupler which facilitates an easy and fast installation of the pipe element coupler with the pipe elements.

Description of Related Arts

A pipe element coupler is generally used for coupling two pipe elements which can be but not limited to two pipes, a pipe and a pipe fitting such as an elbow, a valve, a reducer and a tee, two pipe fittings, a pipe and a device with a pipe-like component, two devices with pipe-like components and etc.

In order for installation of the pipe elements with the pipe element coupler, each of the pipe elements is formed with a groove end portion having an indented groove adjacent to a coupling end portion thereof for coupling with an engaging key of the pipe coupler. The coupling end portion of the groove end portion of each of the pipe elements is generally formed into an enlarged portion having an increased diameter.

A conventional pipe element coupler typically includes two metal housings, a gasket adapted for being received in the metal housings and a plurality of fasteners such as bolt and nut fasteners for firmly fastening the metal housings with each other, which can be found, for example, in U.S. Pat. No. 9,039,046B2. Accordingly, the two metal housings are formed with the engaging keys which are adapted for engaging with the grooves of the pipe elements.

In order to ensure the stability of the engagement between the engaging keys and the grooves, an engaging surface of each of the engaging keys of the conventional pipe element coupler is formed into a circular engaging surface each having a diameter matching with a diameter of a groove circumference at the bottom of the corresponding groove of the pipe element.

Actually, before installation, the two housings should be in an open state that they are not engaged with each to form an inner cavity, and during the installing process, the gasket is mounted on the pipe elements and then the two housings in the open state are mounted on the pipe element in such a manner that the engaging keys are received in the corresponding grooves of the pipe elements, and finally the fasteners are mounted on the metal housings to fasten the two metal housings.

It is thus can be seen that the components of the conventional pipe element coupler should be disassembled before the installation, so that the installing process is time-consuming and effort-consuming that it is not suitable for convenient and fast installation of the pipe element coupler with the pipe elements, and the cost is also relatively high.

SUMMARY OF THE PRESENT INVENTION

The invention is advantageous in that it provides a pipe element coupler and coupling method thereof, wherein the pipe element coupler can be installed on two pipe elements without requiring disassembling components such as a gasket and a fastener for reducing installing steps as well as saving installing time, so as to achieve a quick installation.

Another advantage of the invention is to provide a pipe element coupler and coupling method thereof, wherein the pipe element coupler with preassembled components can be directly pushed to be sleeved on the enlarged coupling end portions of the pipe elements during installation.

Another advantage of the invention is to provide a pipe element coupler and coupling method thereof, wherein when the pipe element coupler is directly preassembled on the pipe elements, only a step of operating on the fastener for fastening the coupling members with each other is required, so as to facilitate the installation process.

Another advantage of the invention is to provide a pipe element coupler and coupling method thereof, wherein the coupling members with the engaging keys are manufactured in a foundry, no additional tools are required for increasing a radius of curvature of each of the engaging keys.

Another advantage of the invention is to provide a pipe element coupler and coupling method thereof, wherein each of the engaging keys has an engaging surface that has varying radiuses of curvature rather than a fixed radius of curvature, during installation, each engaging surface with the varying radiuses is deformed to form a substantially round curvature that a part of or all of the engaging surface is attached to a groove circumference at a bottom of a groove of the corresponding pipe element, so as to achieve a firmly and reliable coupling performance.

Another advantage of the invention is to provide a pipe element coupler and coupling method thereof, wherein the smallest radius of curvature at a position of the engaging surface of each of the engaging keys is substantially the same as a radius of curvature of the groove circumference of the corresponding pipe element. i.e. the smallest radius of curvature at the position of the engaging surface of each of the engaging keys is slightly larger than or equal to the radius of curvature of the groove circumference of the corresponding pipe element, while positions of the engaging surface of each of the engaging keys having a larger radius of curvature is deformed for engaging with the groove circumference during installation of the pipe element coupler, so as to ensure the stable coupling performance.

Another advantage of the invention is to provide a pipe element coupler and coupling method thereof, wherein when the engaging surface has two or more engaging sections having different curves of varying radiuses of curvature, the two curves have a same radius of curvature at transition points therebetween, so as to ensure the reliability of the coupling performance.

Another advantage of the invention is to provide a pipe element coupler and coupling method thereof, wherein when the pipe element coupler is preassembled on the pipe elements, a gap is formed between each of the engaging surfaces of the pipe element coupler and the corresponding groove circumference of each of the pipe elements, and the gap is then reduced by deforming the engaging surface until a part of or all of the engaging surface is attached to the groove circumference of the corresponding pipe element.

Additional advantages and features of the invention will become apparent from the description which follows, and may be realized by means of the instrumentalities and combinations particularly pointing out in the appended claims.

According to the present invention, the foregoing and other objects and advantages are attained by a pipe element coupler for coupling two pipe elements each having a groove and a groove circumference at a bottom of the groove, wherein the pipe element coupler comprises a plurality of coupling members, a gasket and a fastening element. Each of the coupling members comprises two engaging keys at two coupling end portions thereof, wherein each of the engaging keys has an engaging surface having varying radiuses of curvature. The gasket is disposed in the coupling members. The fastening element is mounted on the coupling members, wherein the pipe element coupler is adapted for being preassembled on the two pipe elements to align the engaging keys with the corresponding grooves, wherein when the fastening element is operated to fasten the coupling members together, each of the engaging surfaces is deformed to change the varying radiuses of curvature, so as to substantially match a radius of curvature of the groove circumference.

The present invention further provides a pipe element coupler for coupling two pipe elements each having a groove and a groove circumference at a bottom of the groove, wherein the pipe element coupler comprises two or more coupling members, each having an arc-shape, arranged to be coupled end-to-end to define an inner cavity, a gasket, and a fastening element. Each of the coupling members comprises two engaging keys extended from two sides thereof respectively and two engaging surfaces defined at the engaging keys respectively. The gasket is disposed in the coupling members within the inner cavity thereof. The fastening element is mounted at the coupling members to move the coupling members between a preassembled position and an assembled position, wherein at the preassembled position, the coupling members are arranged for encircling the pipe element to align the engaging keys with the grooves respectively, wherein at the assembled position, the coupling members are fastened with each other for engaging the engaging keys with the grooves respectively in such a manner that each of the engaging keys is deformed to self-adjust a curvature thereof for matching with a curvature of the groove circumference so as to tightly couple the coupling members at the pipe elements to couple the pipe elements end-to-end.

The present invention further provides coupling method for coupling two pipe elements by a pipe element coupler, wherein each of the two pipe elements has a groove, a groove circumference at a bottom of the groove, and comprises an enlarged coupling end portion, wherein the method comprises the following steps.

(a) Receive the two enlarged coupling end portions of the pipe elements at two engaging end portions of the pipe element coupler to align engaging keys of a plurality of coupling members with the corresponding grooves, wherein an engaging surface of each of the engaging keys has varying radiuses of curvature.

(b) Deform the engaging surface of each of the engaging keys to increase a contacting area between the engaging surface and the corresponding groove circumference to retain each of the engaging keys at the corresponding groove.

The present invention further provides a coupling method for coupling two pipe elements by a pipe element coupler, wherein the method comprises the following steps.

(A) Sleeve a first coupling end portion of the pipe element coupler on an enlarged coupling end portion of a first pipe element of the two pipe elements, and insert an enlarged coupling end portion of a second pipe element of the two pipe elements into a second coupling end portion of the pipe element coupler in such a manner that engaging keys of a plurality of coupling members are respectively aligned with the corresponding grooves of the first and second pipe elements, wherein the engaging surface of each of the engaging keys has varying radiuses of curvature, wherein a gap is defined between the engaging surface of each of the engaging keys and a corresponding groove circumference at a bottom of the groove.

(B) Operate on the fastening element to fasten two fastening end portions of the coupling members to reduce the gap between the engaging surface and the corresponding groove circumference, so as to retain the engaging keys at the corresponding grooves.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
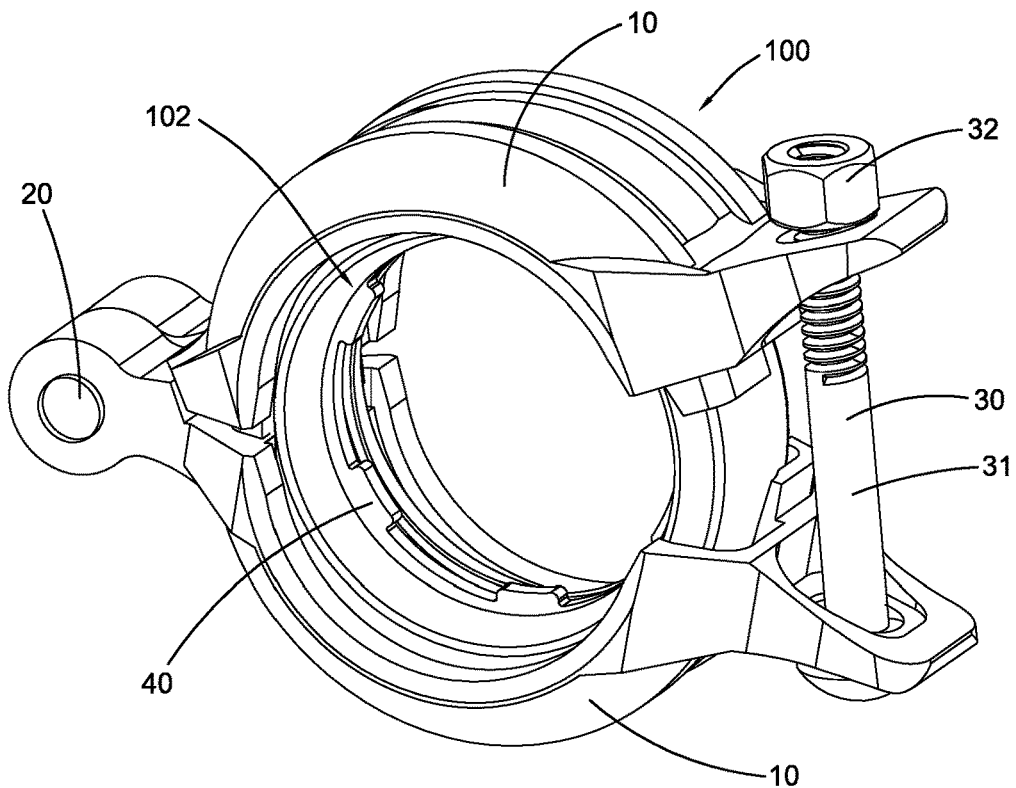
FIG. 1 is a perspective view of a pipe element coupler according to a first preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or position shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

Referring to FIG. 1A to FIG. 15 of the drawings, a pipe element coupler 100 for coupling two pipe elements 200 according to a first preferred embodiment of the present invention is illustrated. The pipe element coupler 100 comprises two coupling members 10, a pivotally connecting element 20 pivotally connecting the two coupling members 10 for allowing the two coupling members 10 to pivotally move with respect to each other, a fastening element 30 for fastening the two coupling members 10 with each other after the pipe element coupler 100 is installed on the two pipe elements 200, and a gasket 40 disposed in the two coupling members 10.

According to this preferred embodiment of the present invention, two opposed ends of the pipe element coupler 100 are respectively connected by the pivotally connecting element and the fastening element 30. In another alternative mode, the two coupling members 10 are movably coupled with each other, two fastening elements 30 may be respectively arranged on the two opposed ends of the pipe element coupler 100 for fastening the two coupling members 10 with each other.

Accordingly, the two coupling members 10, which can be made of metal or plastics, cml be coupled with each other to form a substantially loop structure defining an inner cavity 101. In one embodiment, each of the coupling members 10 has a C-shape defining two sides, wherein the sides of the coupling members 10 are pivotally connected via the connecting element 20. The coupling members 10 are adapted to move between an opened position that the other sides of the coupling members 10 are moved away from each other, and a closed position that the other sides of the coupling members 10 are moved to contact with each other in an end-to-end manner, so as to form the inner cavity 101 with the loop structure. The fastening element 30 is configured to fasten the coupling members 10 at the closed position.

The pivotally connecting element 20 and the fastening element 30 are respectively provided on two opposite sides of the two coupling members 10 for connecting the two coupling members 10. The gasket 40 is disposed in the inner cavity 101 formed by the two coupling members 10 for providing a sealing effect when the two pipe elements 200 are assembled with the pipe element coupler 100.

The two pipe elements 200 are embodied as a first pipe element 210 and a second pipe element 220 and each of the pipe elements 210 and 220 can be but not limited to a pipe, a pipe fitting such as an elbow, a vale and a tee, a device with a pipe-like component. Accordingly, the pipe element coupler 100 can be used for coupling two pipes, a pipe and a pipe fitting, two pipe fittings, a pipe and a device with a pipe-like components, and two devices with pipe-like components. Each of the pipe elements 200 comprises a groove end portion having a groove 201 and an enlarged coupling end portion 202.

Each of the two coupling members 10 comprises a housing body 11 and two engaging keys 12 integrally and inwardly extended from the housing body 11 at two end portions thereof. Each of the two pipe elements 200 has the groove 201 adjacent to the enlarged coupling end portion 202 thereof for engaging with the corresponding engaging key 12 of the two coupling members 10. Accordingly, the groove 201 is indented on an outer circumferential surface of the pipe element 200, such that a diameter of the groove 201 is smaller than an outer diameter of the pipe element 200. The diameter of the coupling end portion 202 is larger than the diameter of a groove circumference 203 at a bottom of the groove 201. In one embodiment, after forming the groove 201, the coupling end portion is formed in such a manner that the diameter of the coupling end portion 202 is gradually increased from the groove 201 to the end of the pipe element 200. In another embodiment, when the groove 201 is formed by cutting off the portion corresponding to the position of the groove 201, the diameters of the coupling end portion 202 along the length can be the same.

According to this preferred embodiment of the present invention, there is no need for disassembling the fastening element 30 and the gasket 40 during the installation of the pipe element coupler 100 with the two pipe elements 200. In other words, the gasket 40 is disposed within the two coupling members 10, and the fastening element 30 is also assembled on the two coupling members 10, and then the whole pipe element coupler 100 is installed on the two pipe elements 200 for coupling with the two pipe elements 200.

Accordingly, there is an opening 102 defined between the two engaging keys 12 of the two coupling members 10 at each of the two end portions thereof that it is big enough for the corresponding enlarged coupling end portion 202 of one of the two pipe elements 200 to pass therethrough, so that the whole pipe element coupler 100 can be directly installed on the two pipe elements 200 without requiring to disassemble the gasket 40 and the fastening element 30.

According to this preferred embodiment of the present invention, each of the engaging keys 12 of the coupling members 10, has an engaging surface 121 which has varying radiuses of curvature, each of the pipe elements 200 has the groove circumference 203 at the bottom of the corresponding groove 201. In other words, the groove circumference 203 is the bottom wall of the groove 201. When the pipe element coupler 100 of the present invention is preassembled on the pipe elements 200 to align the engaging keys 12 with the corresponding grooves 201, the fastening element 30 is operated to firmly fasten the two coupling members in such a manner that the engaging surfaces 121 are deformed and a part of or all of the engaging surface is attached on the corresponding groove circumference 203.

In other words, the engaging surface 121 of each of the engaging keys 12 of the coupling members 10 does not have a fixed radius of curvature and thus each of the engaging surfaces 121 is not a circular surface with a round curvature. The groove circumference 203 of each of the pipe elements 200 has a substantially round curvature.

When the pipe element coupler 100 of the present invention is preassembled on the pipe elements 200 to align the engaging keys 12 with the corresponding grooves 201, a gap 103 is formed between each engaging surface 12 of each of the two coupling members and the corresponding groove circumference 203 of each of the pipe elements 200 and then when the fastening element 30 is operated. the gap 103 is reduced until each of the engaging surfaces 121 is retained at a position that the firmly and stably coupling between the pipe elements 200 with the pipe element coupler 100 is achieved.

According to this preferred embodiment, each of the engaging surfaces 121 defines a curve of varying radiuses of curvature which can be but not limited to a logarithmic spiral curve, an archimedes spiral curve, a pascal spiral curve, an ellipse curve, a high power curve and a combination thereof. Accordingly, each of the engaging surfaces 121 does not have a round curvature and thus the gap 103 is created when each of the engaging keys 12 of the pipe element coupler 100 of the present invention is preassembled in the corresponding grooves 201 of the pipe elements 200.

In addition, at least a portion of each of the engaging surfaces 121 has a relative large radius of curvature which is larger than a radius of curvature of the enlarged coupling end portion 202 of each of the pipe elements 200, so that a size of the opening 102 formed between two engaging surfaces 121 of the two engaging keys 12 is larger than a diameter of the enlarged coupling end portion 202 of each of the two pipe elements 200, and thus the pipe element coupler 100 can be mounted on the pipe elements by sleeving on the enlarged coupling end portion 202 of each of the pipe elements 200. In other word, the enlarged coupling end portion 202 of each of the pipe elements 200 is able to be inserted into the pipe element coupler 100 by passing through the opening 102 between the two engaging surfaces 121.

When the pipe element coupler 100 is mounted to a position that it is preassembled with the pipe elements 200 to align each of the engaging keys 12 with the corresponding grooves 201, the gap 103 is created between each of the engaging surfaces 121 of the pipe element coupler 100 and the corresponding groove circumference 203 of each of the pipe elements 200, allowing the pipe element coupler 100 to be installed on the pipe elements 200 in a preassembled state without requiring to disassemble the fastening element 30 and the gasket 40. When the gap 103 is gradually reduced by operating on the fastening element, each of the engaging surface 121 is deformed to allow a deformed radius of curvature thereof to be substantially equal to the radius curvature of the groove circumference 203 of each of the pipe elements 200.

More specifically, the housing body 11 of each of the coupling members 10 comprises a body portion 111, a pivotally connecting end portion 112 and a fastening end portion 113. The pivotally connecting end portion 112 and the fastening end portion 113 are respectively integrally extended from two opposite sides of the body portion 111 The pivotally connecting element 20 pivotally connecting the two pivotally connecting end portions 112 of the two housing bodies 11 in such a manner that the two pivotally connecting end portions 112 of the two housing bodies 11 are able to pivotally move with respect to each other. The fastening element 30 is mounted to the two fastening end portions 113 of the two housing bodies 11 for firmly fastening the two coupling members 10 with each other.

Figure 2:
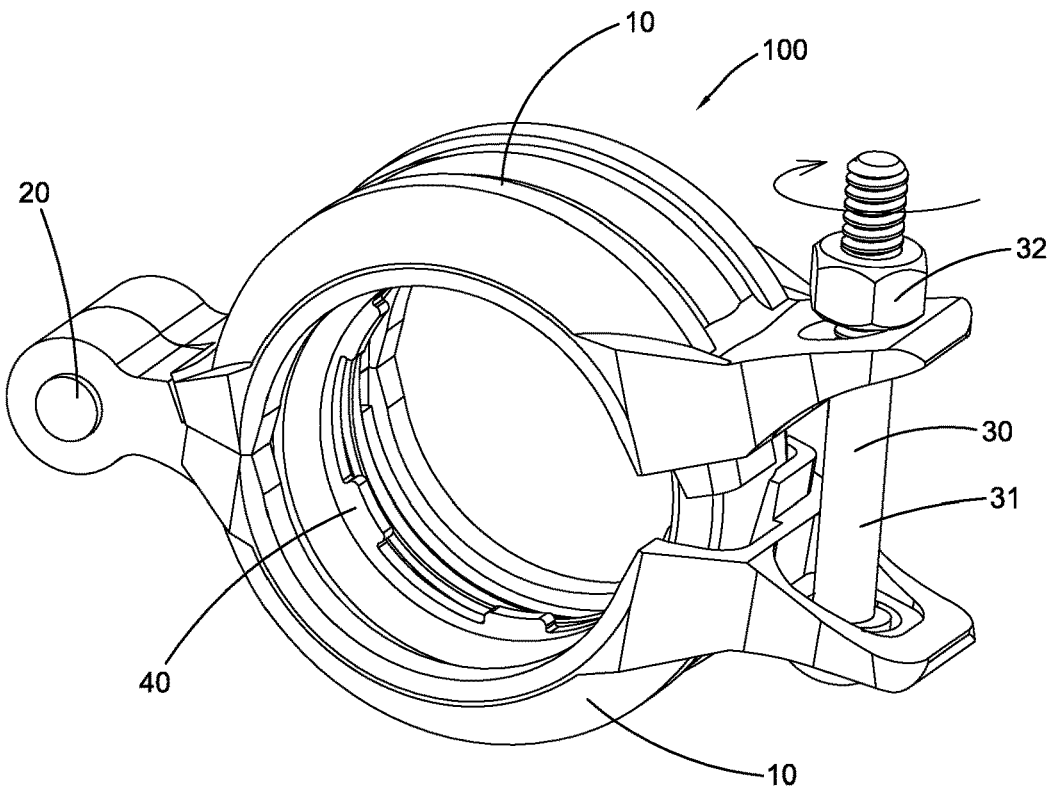
FIG. 2 is a perspective view illustrating a fastening element being operated for fastening two coupling members of the pipe element coupler according to the above first preferred embodiment of the present invention.
Figure 3:
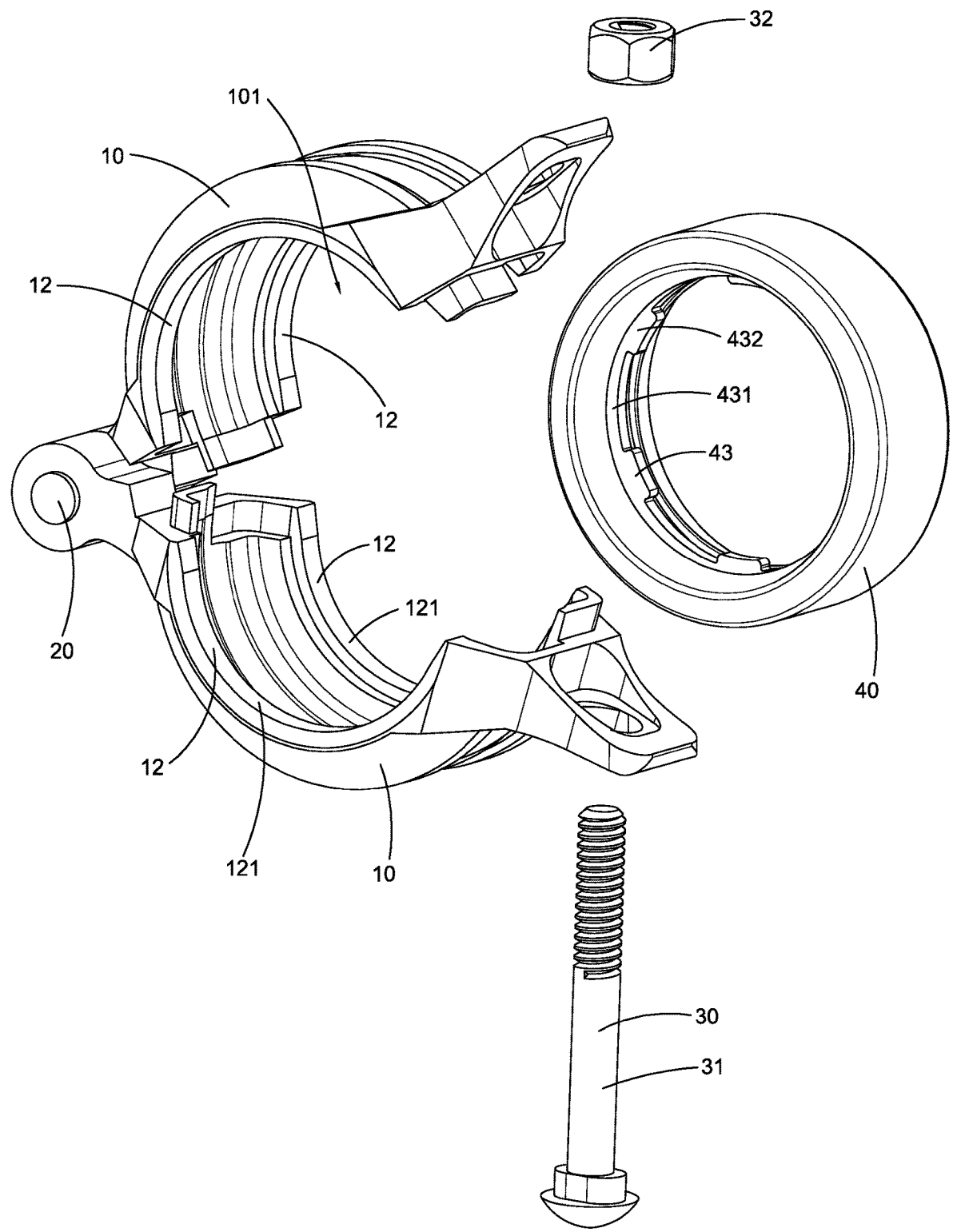
FIG. 3 is an exploded view of the pipe element coupler according to the above first preferred embodiment of the present invention.
Figure 4A:
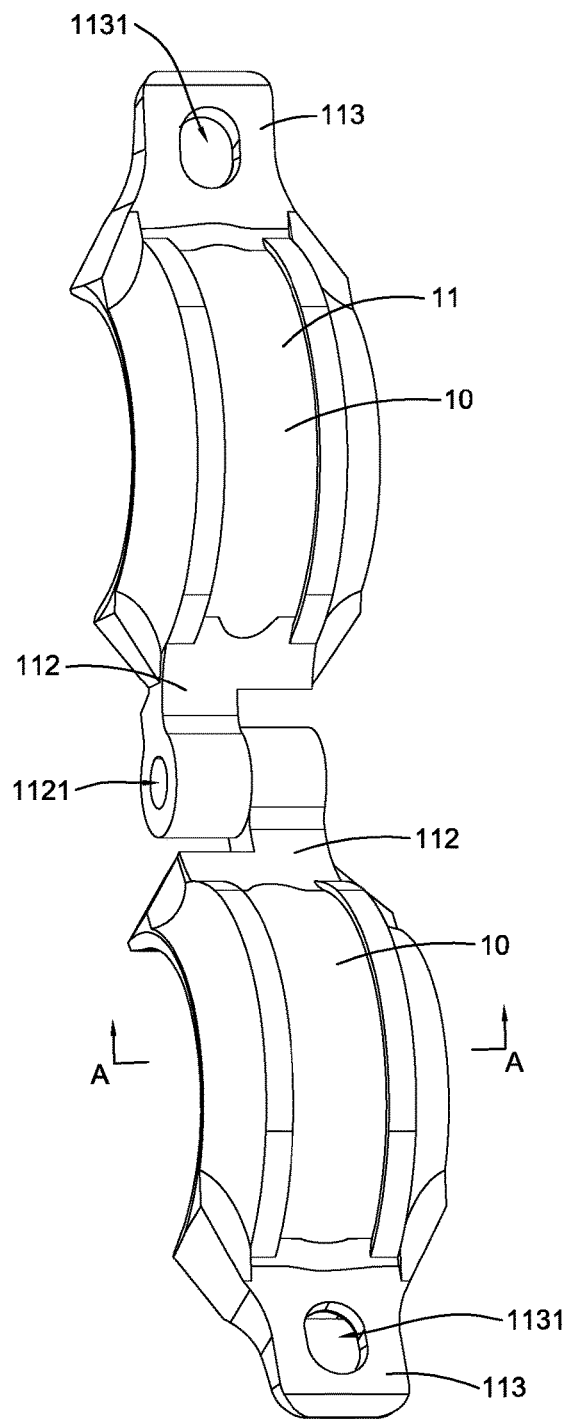
FIG. 4A and FIG. 4B are perspective views illustrating the pivotally movable coupling members of the pipe element coupler according to the above first preferred embodiment of the present invention.
Figure 4B:
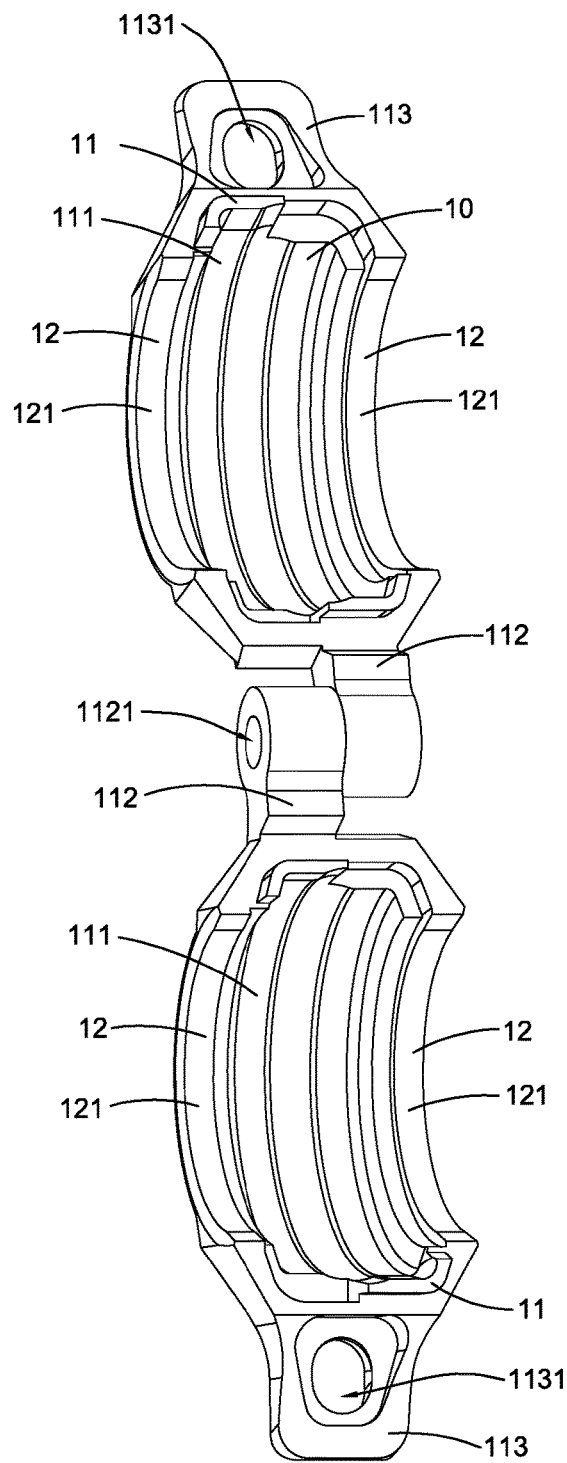
Figure 5:
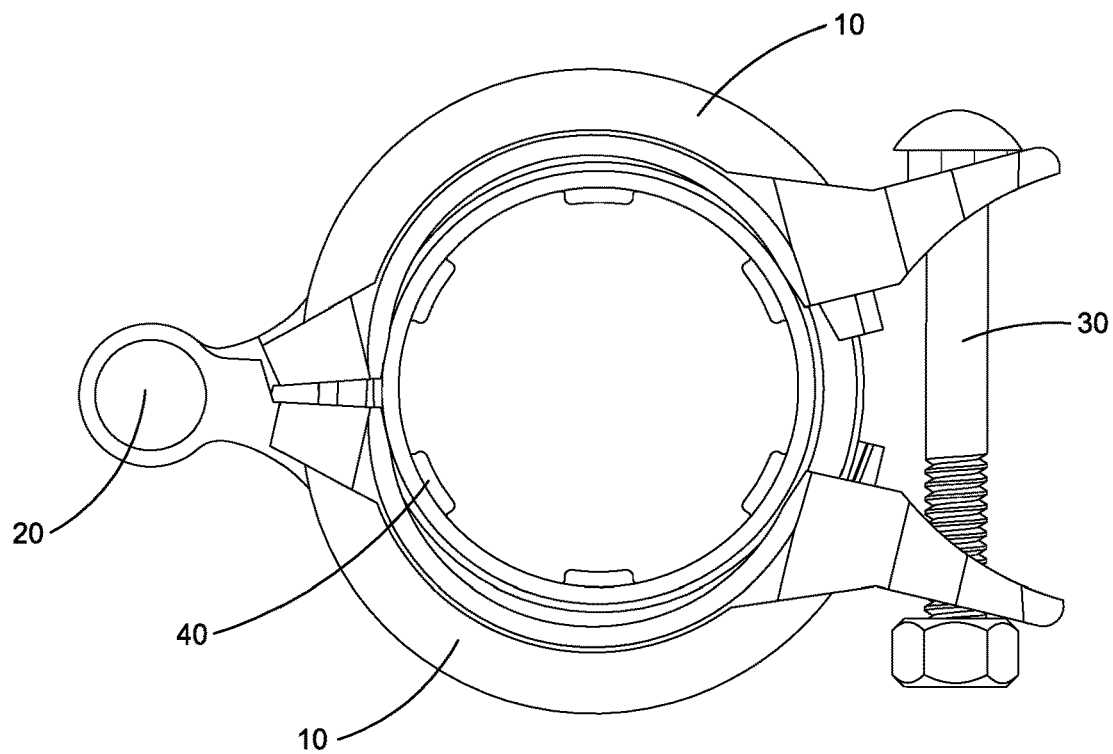
FIG. 5 is a front view of the pipe element coupler according to the above first preferred embodiment of the present invention.
Figure 6:
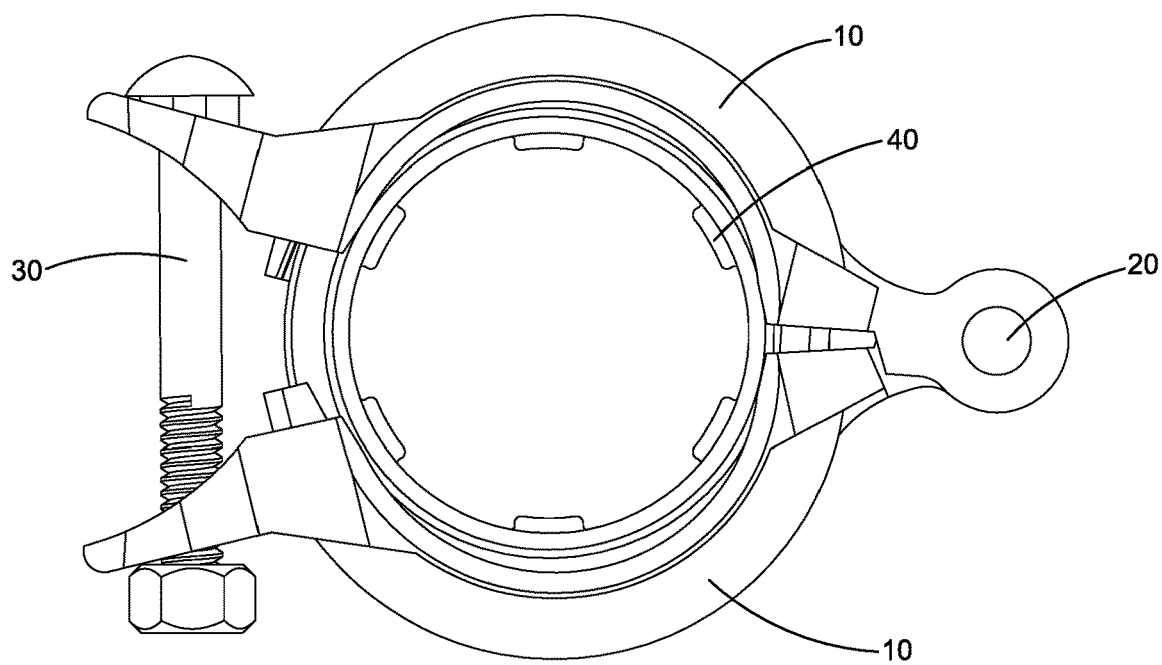
FIG. 6 is a rear view of the pipe element coupler according to the above first preferred embodiment of the present invention.
Figure 7:
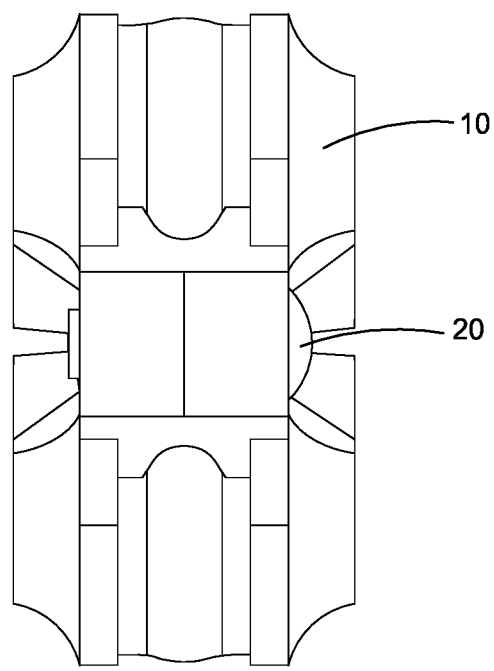
FIG. 7 is a left side view of the pipe element coupler according to the above first preferred embodiment of the present invention.
Figure 8:
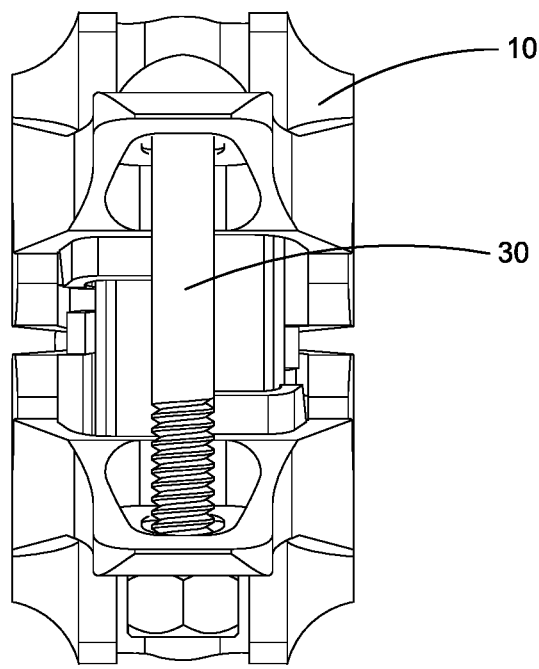
FIG. 8 is a right side view of the pipe element coupler according to the above first preferred embodiment of the present invention.
Figure 9:
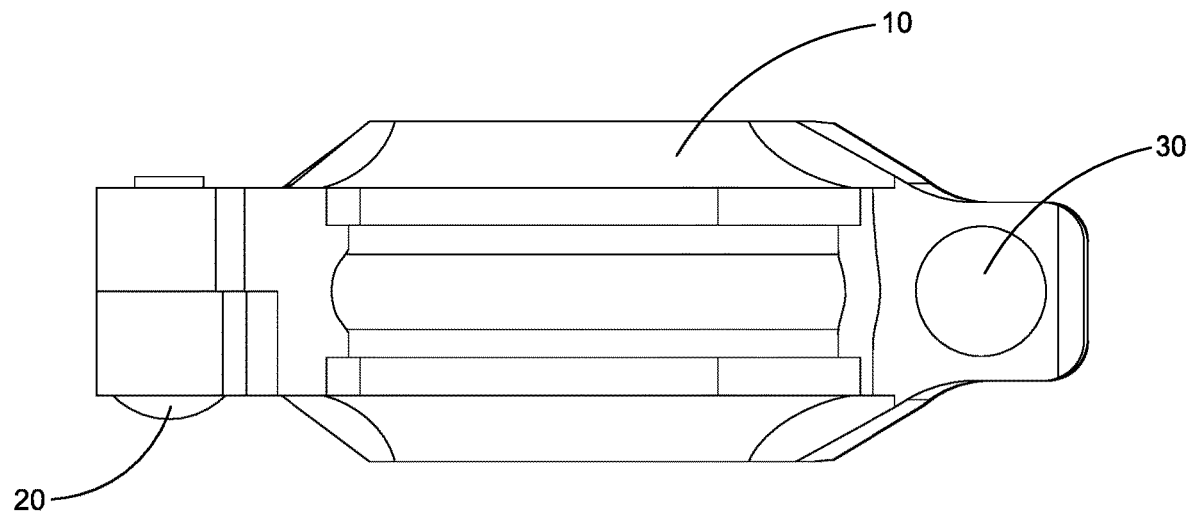
FIG. 9 is a top view of the pipe element coupler according to the above first preferred embodiment of the present invention.
Figure 10:
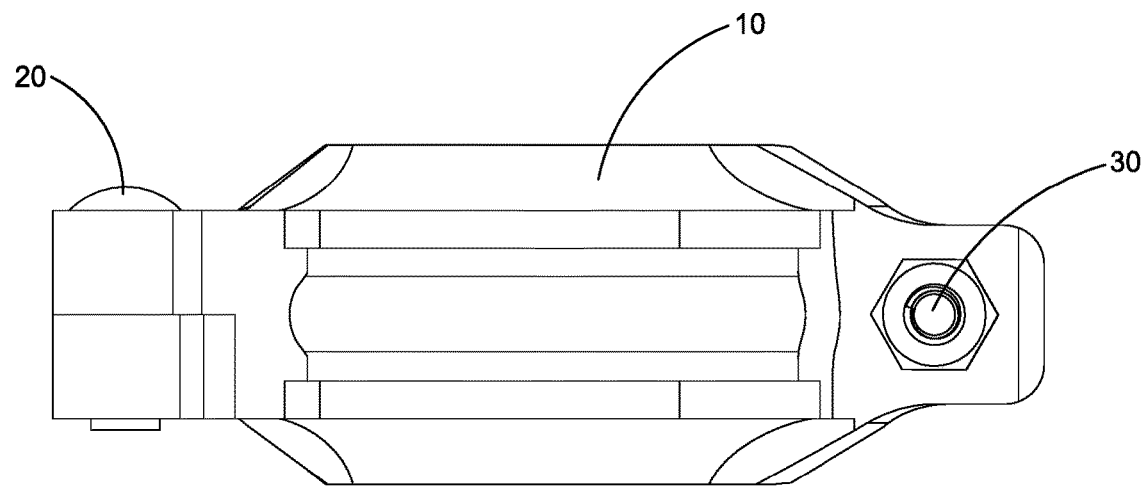
FIG. 10 is a bottom view of the pipe element coupler according to the above first preferred embodiment of the present invention.

As shown in FIG. 1 to FIG. 10 of the drawings, the pipe element coupler 100 is assembled with its components before being installed on the pipe elements 200. Referring to FIG. 2 of the drawings, the pipe elements 200 are not shown in the drawings, FIG. 2 illustrates that the fastening element 30 can be operated to drive the two fastening end portions 113 to move toward each other, so that the pipe element coupler 100 in a preassembled state can be moved into a final assembled state.

According to this preferred embodiment, each of the pivotally connecting end portions 112 has a connecting hole 1121 and the pivotally connecting element 20 is a connecting pin penetrating through the connecting hole 1121. Each of the fastening end portions 113 has a fastening hole 1131 while the fastening element 30 is embodied to comprise a bolt 31 penetrating through the fastening hole 1131 and a nut 32. Accordingly, when the pipe element coupler 100 is preassembled on the pipe elements 200, the bolt 31 and the nut 32 can be operated, so as to direct the engaging surfaces 121 to engage and contact with the groove circumferences 203.

Referring to FIG. 1 to FIG. 10 of the drawings, before installation, the gasket 40 is disposed in the inner cavity 101 of the housing bodies 11, the bolt 31 is assembled with the two fastening end portions 113 and the nut 32 is assembled on the bolt 31. And when the pipe element coupler 100 is able to be installed with the pipe elements 200, the gasket 40 is not required to be detached from the housing bodies 11, the bolt 31 and nut 32 are not required to be removed from the two fastening end portions 113.

Accordingly, the two coupling members 10 can be pivotally moved with respect to the pivotally connecting element 20 which functions as a pivot point. When the fastening element is operated, the openings 102 of the pipe element coupler 100 are reduced, and the distance between the two fastening end portions 113 is reduced, so that when the engaging keys 12 are moved to desired positions that a part of or all of the engaging surfaces 121 are attached to the groove circumferences 203 so that the engaging keys 12 are firmly retained at the corresponding grooves 201 of the pipe elements 200.

Preferably, each of the two coupling members 10 has two symmetrical engaging keys 12 at two opposite engaging ends thereof. An engaging key 12 of one of the two coupling members 10 is aligned with another engaging key 12 of the other coupling member 10 to form the opening 102. In other words, two pairs of the engaging keys 12 form two openings 102 at the two engaging ends of the pipe element coupler 100. Furthermore, the two coupling members 10 are preferred to be constructed to have a same structure that all of the coupling members 10 can be manufactured in the foundry. When the bolt 31 and the nut 32 of the fastening element 30 are operated, both of the two pairs of engaging surfaces 121 at the two engaging ends thereof are deformed so as to direct the engaging surfaces 121 to have contact with the groove circumferences 203 of the pipe elements 200.

Figure 12:
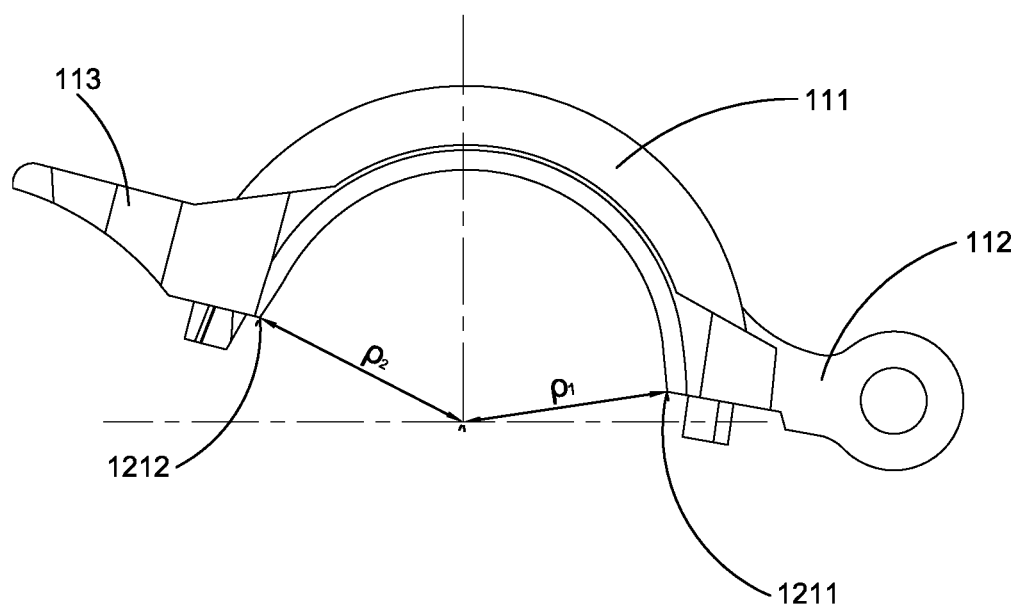
FIG. 12 is a schematic view illustrating a coupling member of the pipe element coupler according to the above first preferred embodiment of the present invention.

Referring to FIG. 12 of the drawings, according to this preferred embodiment, a proximate end point 1211 of each of the engaging surfaces 121 of the engaging keys 12 adjacent to the pivotally end portion 112 of the housing body 11 of the coupling member 10 has a smallest radius of curvature that is equal to or slightly larger than (not larger than 5%) the radius of curvature of the groove circumference 203 of each pipe element 200. In other words, the smallest radius of curvature at the proximate end point 1211 of each of the engaging surfaces 121 is substantially the same as the radius of curvature of the groove circumference 203 of each pipe element 200. In other words, the smallest radius of curvature at the proximate end point 1211 of each of the engaging surfaces 121 is substantially the same as the radius of curvature of the groove circumference 203 of each pipe element 200. Therefore, when the pipe element coupler 100 is preassembled with the pipe elements 200, the surface at the proximate end point 1211 of each of the engaging surfaces 12 is attached on the corresponding groove circumference 203 of each of the pipe elements 200.

A distal end point 1212 of each of the engaging surfaces 121 of the engaging keys 12 adjacent to the fastening end portion 113 of the housing body 11 of the coupling member 10 has a largest radius of curvature that is larger than the radius of curvature of the enlarged coupling end portion 202 of each pipe element 200. Therefore, the opening 102 defined between the pair of engaging surfaces 121 is big enough for the pipe element coupler 100 to be directly sleeved on the pipe elements 200 so as to preassemble the pipe element coupler 100 with the pipe elements 200, the surface at the distal end point 1212 of each of the engaging surfaces 12 is not having contact with the corresponding groove circumference 203 of each of the pipe elements 200 and the gap 103 is actually formed between each of the engaging surfaces 12 in the corresponding groove 201 and the corresponding groove circumference 203 of each of the pipe elements 200.

Accordingly, as a preferred example, radiuses of curvatures of each of the engaging surfaces 121 according to this preferred embodiment of the present invention are preferred to be gradually increased from the proximate end point 1211 to the distal end point 1212.

Figure 11:
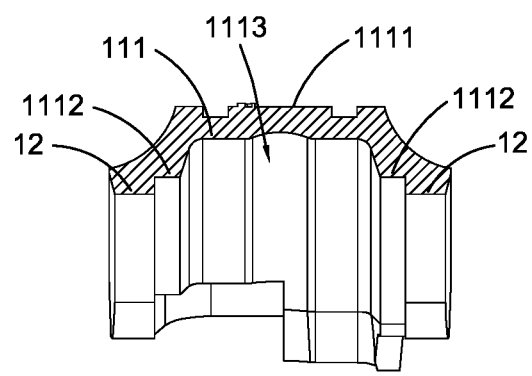
FIG. 11 is a sectional view along line A-A of FIG. 3.

Referring to FIG. 11 of the drawings, the body portion 111 of each of the housing bodies 11 further comprises a middle chamber body portion 1111 and two shoulder portions 1112 at two opposite sides of the chamber body portion 1111. The two engaging keys 12 are integrally and inwardly extended from an inner surface of the body portion 111. A retaining groove 1113 is formed within the chamber body portion 111 for retaining the gasket 40 in position.

The inner surfaces of the chamber body portion 1111 and shoulder portions 1112 can be a circular surface. Alternatively, the inner surfaces of the chamber body portion 1111 and shoulder portions 1112 may also be formed with varying radiuses of curvature.

Figure 13A:
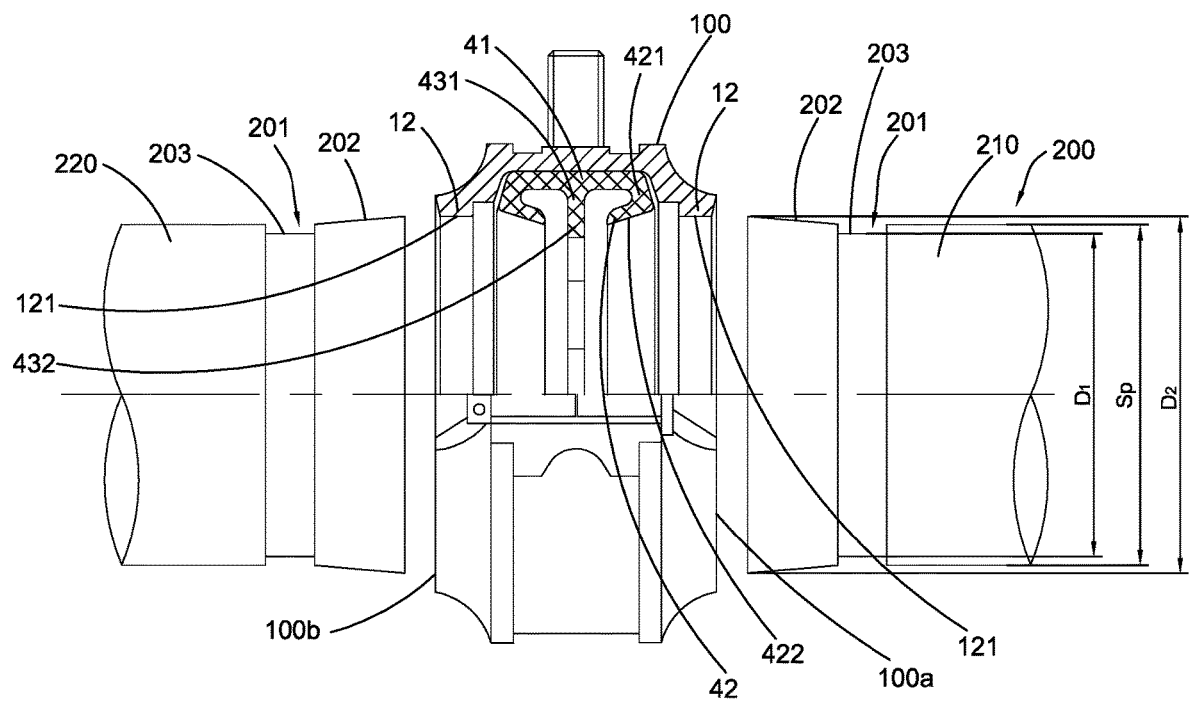
FIG. 13A is a schematic view illustrating the pipe element coupler adapted for being installed with two pipe elements according to the above first preferred embodiment of the present invention.

Referring to FIG. 13A to FIG. 13D of the drawings, the process for assembling the pipe element coupler 100 with the pipe elements of the instant invention is illustrated. As shown in FIG. 13A of the drawings, the pipe element coupler 100 is assembled with its components before being installed with the two pipe elements 200 each comprising the enlarged end portion 202 and having the groove 201.

Figure 13B:
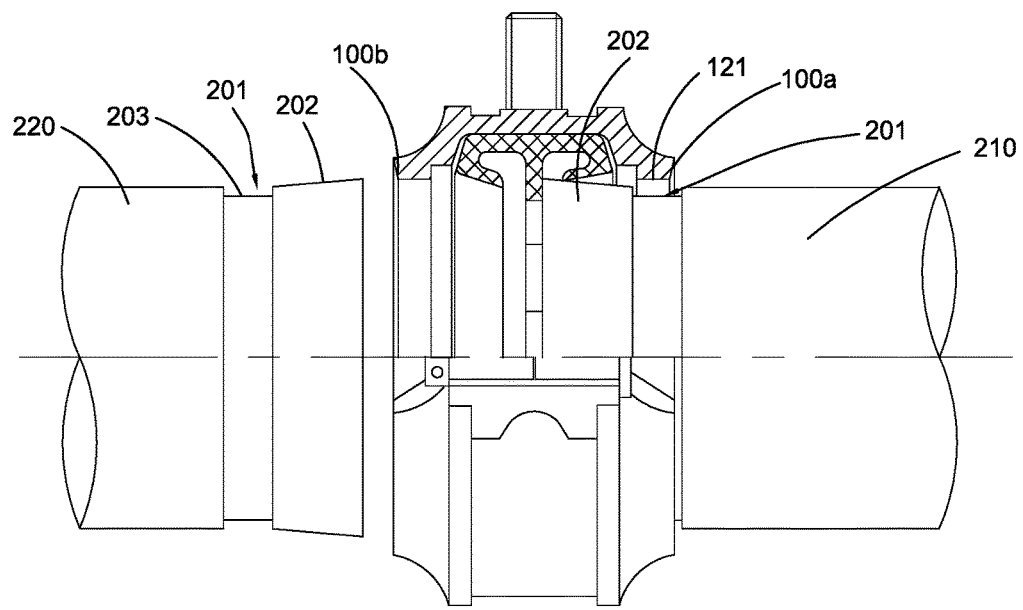
FIG. 13B is a schematic view illustrating the pipe element coupler being installed with one of the two pipe elements according to the above first preferred embodiment of the present invention.

As shown in FIG. 13B of the drawings, without requiring to disassemble the gasket 40 and the fastening element 30, the pipe element coupler 100 is able to be directly sleeved on the first pipe element 210. More specifically, the pipe element coupler 100 has a first coupling end portion 100a which receives the enlarged coupling end portion 202 of the first pipe element 210. When a user mounts the pipe element coupler 100 with the first pipe element 210, the enlarged coupling end portion 202 of the first pipe element 210 is inserted into the first coupling end portion 100a of the pipe element coupler 100, and the user may use one or more fingers to press on a second coupling end portion 100b of the pipe element coupler 100 to retain the pipe element coupler 100 in position, so as to facilitate the installation of the first pipe element 210. The engaging key 12 adjacent to the first coupling end portion 100a is aligned with and retained at the groove 201 of the first pipe element 210.

Figure 13C:
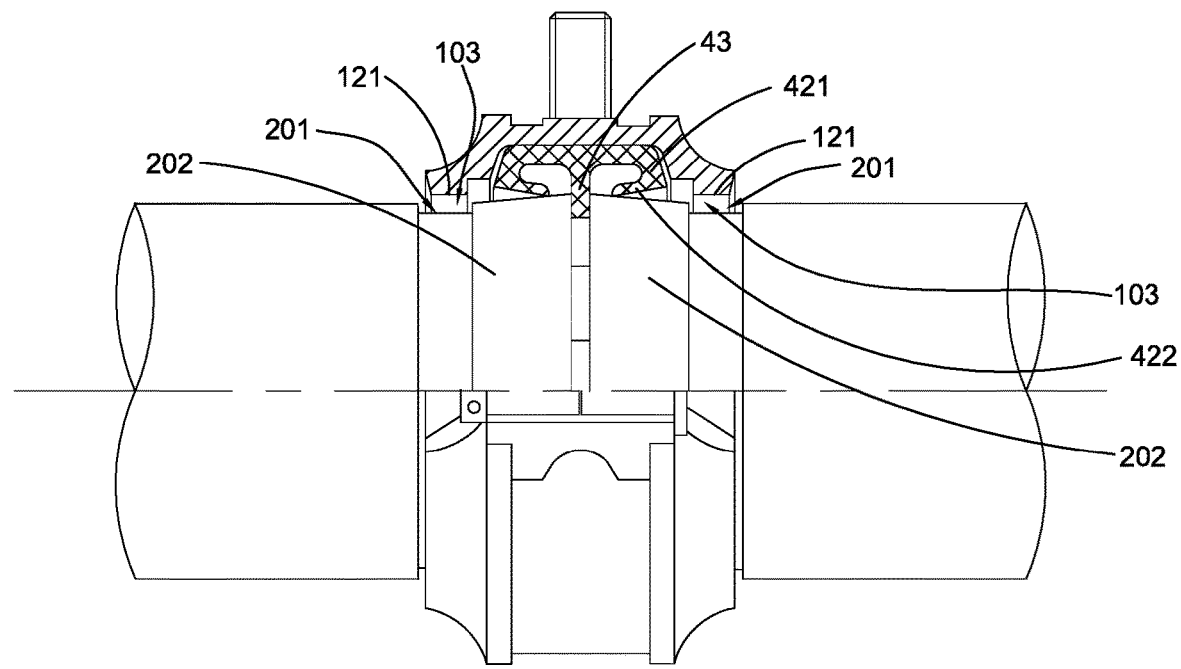
FIG. 13C is a schematic view illustrating the pipe element coupler being preassembled with both of the two pipe elements according to the above first preferred embodiment of the present invention.

Referring to FIG. 13C of the drawings, the second pipe element 220 is then installed with the pipe element coupler 100, so that the pipe element coupler 100 is in a preassembled state. More specifically, the enlarged coupling end portion 202 of the second pipe element 220 is inserted into the second coupling end portion 100b of the pipe element coupler 100, so that the engaging key 12 adjacent to the second coupling end portion 100b is also aligned with and retained at the groove 201 of the second pipe element 220.

Accordingly, since each of the engaging surfaces 121 of the pipe element coupler has varying radiuses of curvature along its circumferential extending direction, the gap 103 is formed between each of the engaging surfaces 121 of the pipe element coupler 100 and the groove circumferences 203 of the pipe elements 210 and 220 when the engaging keys 12 are aligned with the corresponding grooves 201 of the pipe elements 210 and 220. A width of the grooves 201 of the pipe element is slightly larger than a width of the engaging keys 12.

In addition, the gasket 40 is assembled in the coupling members 10, so that when the pipe element coupler 100 is preassembled with the two pipe elements 210 and 220, the gasket which is made of a flexible material, is wound around the enlarged coupling end portions 202 of the two pipe element 210 and 220 to provide a sealing effect for the coupling of the two pipe element 210 and 220.

The gasket 40 comprises a base body 41, two biasing element 42 integrally extended from the base body 41, and a retaining element 43 integrally extended from a middle inner surface of the base body 41. In other words, the biasing elements 42 are extended from two sides of the base body 41 respectively, wherein the retaining element 43 is located between the biasing elements 42. The retaining element 43 further comprises a retaining body 431 and a plurality of protrusions 432 which are spaced apart from each other and are integrally extended from the retaining body 431. When the two enlarged coupling end portions 202 of the pipe elements 200 are preassembled in the coupling members 10, the protrusions 432 are sandwiched between the two enlarged coupling end portions 202 of the pipe elements 200, while the two biasing elements 42 are respectively biasing against outer walls 2021 of the enlarged coupling end portions 202 of the pipe elements 200. When the fastening element 30 is operated for fastening the two fastening end portions 113, the gasket 40 is also deformed so as to be firmly attach with the enlarged coupling end portions 202 of the pipe elements 200. More specifically, each of the biasing element 42 comprises an extending portion 421 integrally extended from the base body 41 and a biasing portion 422 inwardly and inclinedly extended form the extending portion 421 for biasing against the outer wall 2021 of the corresponding enlarged coupling end portion 201 of the pipe elements 200. Particularly, the base body 41 has an annular shape, wherein the extending portions 421 of the biasing elements 42 are inwardly and radially extended from two sides of the base body 41 respectively, while the biasing portions 422 are inclinedly extended from free ends of the extending portions 421, such that the biasing portions 422 are extended toward each other. During the assembling process of the pipe element coupler 100 with the pipe elements 200, the biasing element 42 is deformed and the biasing portion 422 is moved along the outer wall 2021 of the corresponding coupling end portion 202, so as to enhance the sealing effect between the gasket 40 and the enlarged coupling end portions 202. In other words, the biasing portion 422 of the biasing element 42 is pushed inwardly when the pipe element 200 is coupled at the pipe element coupler 100.

Figure 13D:
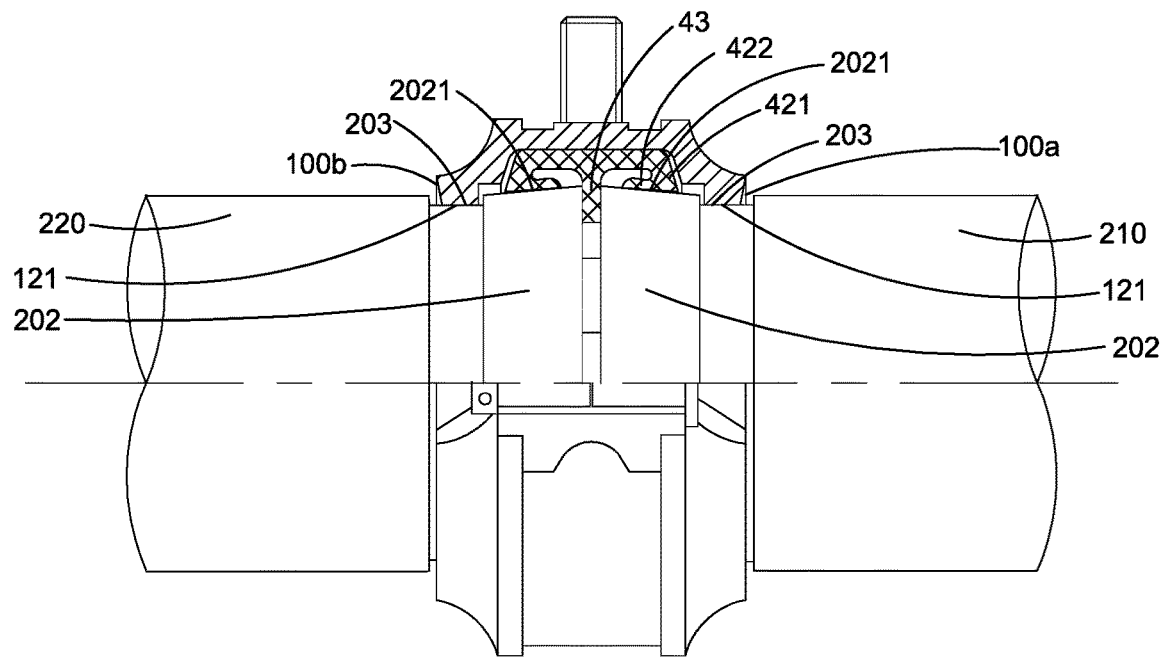
FIG. 13D is a schematic view illustrating the pipe element coupler being firmly assembled on the two pipe elements according to the above first preferred embodiment of the present invention.

Referring to FIG. 13D of the drawings, when the fastening element 30 is operated to firmly retain the engaging keys 12 at the grooves 201, the gap 103 between each engaging surface 121 and the groove circumference 203 is reduced, each of the engaging surfaces 121 is deformed to change its radiuses of curvatures along its circumferential direction to have contact with the groove circumference 203. Each of the deformed engaging surfaces has a substantially round curvature for matching with the radius of curvature of the corresponding groove circumference 203 of each of the pipe elements 210 and 220.

Figure 14A:
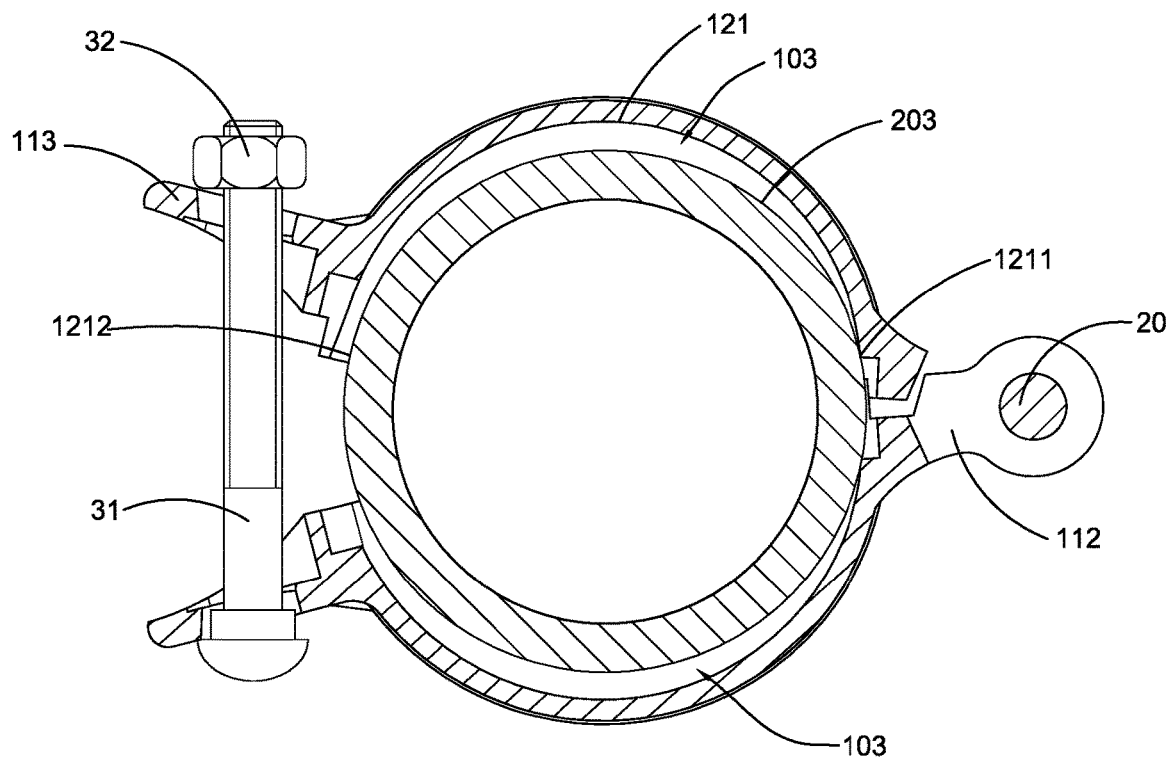
FIG. 14A is a sectional view illustrating the pipe element coupler being preassembled with the two pipe elements according to the above first preferred embodiment of the present invention.
Figure 14B:
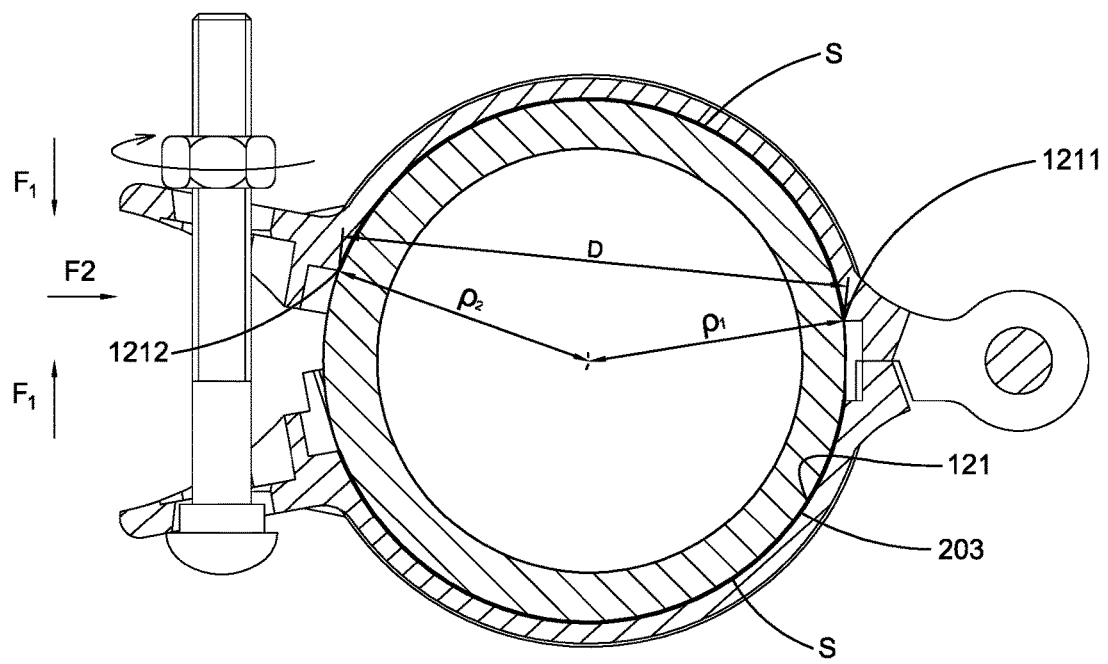
FIG. 14B is a sectional view illustrating gaps between engaging surfaces and groove circumferences are reduced to assemble the pipe element coupler with the two pipe elements according to the above first preferred embodiment of the present invention.

FIGS. 14A and 14B are sectional views illustrating the pipe element coupler 100 being operated from the preassembled state shown in FIG. 14A to the final assembled state shown in FIG. 14B. As shown in FIG. 14A, the pipe element coupler 100 is preassembled on the pipe elements 200 while the fastening element 30 comprising the bolt 31 and the nut 32 is in a loose state, the gap 103 is formed between each of the engaging surfaces and the corresponding groove circumference 203 of each of the pipe elements 200.

According to this preferred embodiment, the radius of curvature at the proximate end point 1211 adjacent to the pivotally connecting end portion 112 is substantially equal to the radius of curvature of the corresponding groove circumference 203, the radius of curvature at the distal end point 1212 adjacent to the fastening end portion 113 is larger than the radius of curvature of the enlarged coupling end portion 202, and the radiuses of curvature of each of the engaging surface 121 are gradually increased from the proximate end point 1211 to the distal end point 1212, so that the gap 103 is also gradually increased from the position adjacent to the pivotally connecting end portion 112 to a position adjacent to the fastening end portion 113.

As shown in FIG. 14B, the nut 32 is screwed to move along the bolt 31, a distance between the two fastening end portions 113 is reduced, the gap 103 is reduced, so that each of the engaging surfaces 121 tends to be moved to a position that it is having contact with the groove circumference 203. Accordingly, each of the engaging surfaces 121 is deformed to change the varying radiuses of curvature, so as to substantially match a radius of curvature of the groove circumference 203, so that a perimeter of the pair of engaging surfaces 121 is substantially equal to or slightly larger than a perimeter of the corresponding groove circumference 203.

When in the assembled state, the perimeter of the pair of engaging surfaces 121 is substantially equal to the perimeter of the corresponding groove circumference 203, the pair of engaging surfaces 121 form a substantially circular surface having a substantially round curvature matching with the curvature of the corresponding groove circumference 203, the gap 103 is substantially vanished, a diameter of the pair of engaging surfaces 121 is substantially the same as the diameter of the corresponding groove circumference 203, all of the engaging surfaces 121 are substantially attached on the corresponding groove circumferences 203, so that a relatively rigid coupling between the pipe element coupler 100 and the pipe elements 200 is achieved, so as to ensure the reliability of the coupling of the two pipe elements.

If the perimeter of the pair of engaging surfaces 121 is larger than the perimeter of the corresponding groove circumference 203 when the pipe element coupler 100 is in the final assembled state, a minimum clearance is still remained between a part of the engaging surface 121 and a part of the corresponding groove circumference 203, most part of the engaging surface 121 is attached on the corresponding groove circumference 203, the diameter of the pair of engaging surfaces 121 is slightly larger than the diameter of the corresponding groove circumference 203 (not larger than 10%), so that a relatively flexible coupling between the pipe element coupler 100 and the pipe elements 200 is achieved.

Referring to FIG. 14B of the drawings, when the nut 32 is being rotated to generate a torque, Forces F1 are created along the bolt 31 by the torque, which results in the deformation of the engaging surfaces 121 of the coupling members 10 and also results in the creation of the radial Force F2. When the torque is gradually increased, the deformation of the coupling members becomes more apparent, and the deformation is finished until the torque reaches to a predetermined value. There is substantially no deformation at the proximate end point 1211 adjacent to the pivotally connecting end portion 112, but the deformation from the proximate end point 1211 to the distal end point 1212 is gradually increased, and the maximum deformation is produced at the distal end point 1212, so that the radius of curvature $\rho_2$ at the distal end point 1212 is reduced to substantially equal to the radius of curvature $\rho_1$ at the distal end point 1211 which is substantially equal to the radius of curvature of the corresponding round groove circumference 203.

As a typical example of this preferred embodiment of the present invention, each of the engaging surfaces 121 defines a logarithmic spiral curve, in other words, a cross section of each of the engaging surfaces 121 forms a curve which is a logarithmic spiral curve. When the pipe element coupler 100 is operated from the preassembled state to the final assembled state, the deformation of each of the engaging surfaces 121 results in deformed and varied radiuses of curvature thereof, and the variation range thereof is about 4.5% to 12%. A parameter D denotes a distance between the proximate end point 1211 and the distal end point 1212, during the tight fastening process of the pipe element coupler 100, the value of parameter D is gradually reduced, and the variation range of the parameter D is about 4% to 15%.

Figures 15A, 15B:
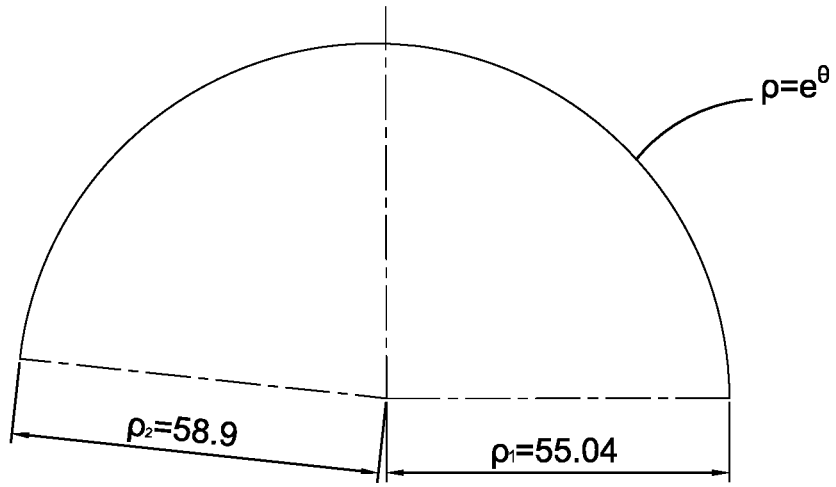
FIG. 15A is a schematic view illustrating varying radiuses of curvable of the pipe element coupler according to the above first preferred embodiment of the present invention.
FIG. 15B illustrates different ranges of 8 for different specifications of the two pipe elements coupled with each other by the pipe element coupler according to the above first preferred embodiment of the present invention.
Figure 16:
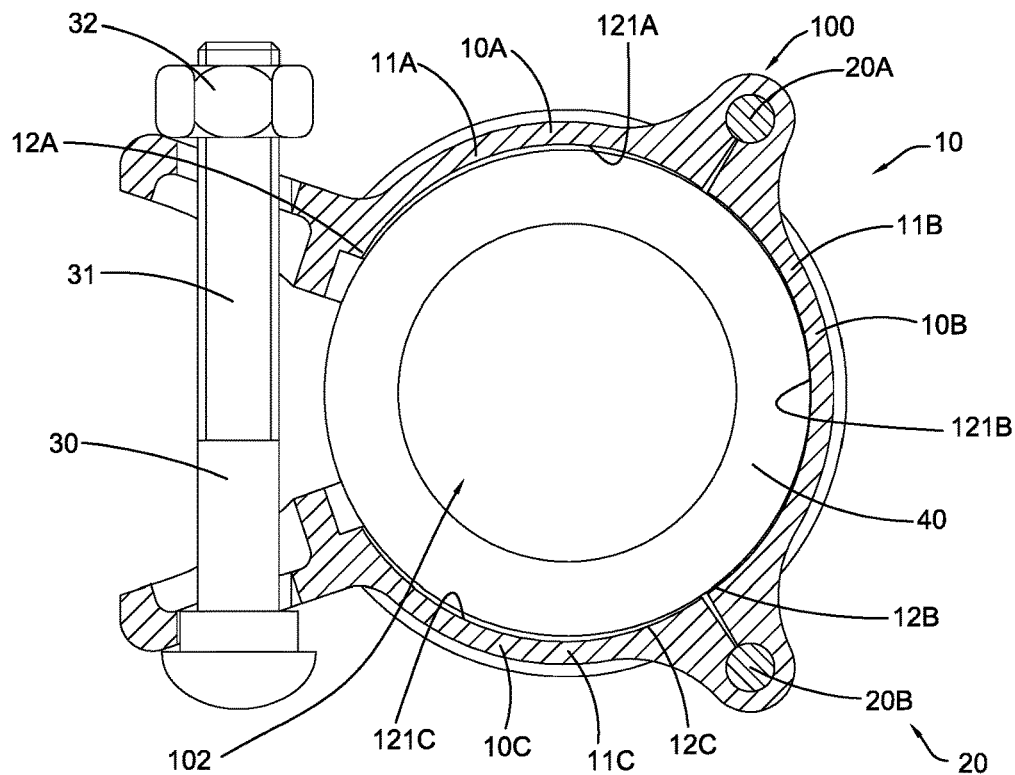
FIG. 16 is a schematic view of a pipe element coupler according to a second preferred embodiment of the present invention.

Referring to FIGS. 15A and 15B of the drawings, according to a specific example of this preferred embodiment of the present invention, each of the engaging surfaces 121 defines a logarithmic spiral curve having an equation of $\rho=e^\theta$, wherein $\theta$ has a range of 0-180°.

More specifically, FIG. 15B illustrates different ranges of $\theta$ for different specifications of the two pipe elements 200 which are coupled with each other by the pipe element coupler 100. The specification of the two pipe elements 200 is the diameter of the pipe elements 200 at a regular body portion other than the enlarged coupling end portion 202.

According to this preferred embodiment, the value of the parameter $\rho_1$ is the radius of curvature at the proximate end point 1211, and is also the radius curvature of the groove circumference 203 of the corresponding pipe element 200, the value of the parameter $\rho_2$ is the radius curvature at the distal end point 1212 of the engaging surface 121 of the corresponding pipe element coupler 100, a parameter D1 denotes the diameter of the groove circumference 203 of each of the pipe elements 200, a parameter D2 denotes the diameter of the enlarged coupling end portion 202 of each of the pipe elements 200, as shown in FIG. 13A, D2 is equal to the diameter at a proximate end of the enlarged coupling end portion 202 which is distal to distal end adjacent to the groove 201, Sp denotes the specification of the pipe element 200 which is a diameter of a body portion of the pipe element 200 and may be smaller than D2, or D2 is equal to Sp, then considering that the parameter $\rho_2$ which is the radius curvature at the distal end point 1212 of the engaging surface 121 of the corresponding pipe element coupler 100 should be larger than the radius of curvature of the enlarged coupling end portion 202, the value of the parameter $\rho_2$ should be added with an additional allowance R which has a range of 0.3-1 mm. Accordingly, $\rho_1=D1/2$, while $\rho_2=D2/2+R$.

As a specific example, when the specification Sp of the pipe element 200 is 114.3 mm, the diameter D1 of the groove circumference 203 of each of the pipe elements 200 is 110.08 mm, the diameter D2 of the enlarged coupling end portion 202 of each of the pipe elements 200 is 116.8 mm, and R is 0.5 mm, then $\rho_1=110.08/2=55.04$ mm, while $\rho_2=116.8/2+0.5=58.9$ mm.

According to this preferred embodiment of the present invention, referring to FIG. 14B of the drawings, the present invention further provides a method for coupling two pipe elements 200 via the pipe element coupler 100. More specifically, the method comprises the following steps:

(a) Receiving the two enlarged coupling end portions 201 of the pipe elements 200 at two engaging end portions 100a and 100b of the pipe element coupler 100 to align each of the engaging keys 12 of the coupling members 10 with the corresponding groove 201 of the pipe elements 200, wherein the engaging surface 121 of each of the engaging keys 12 has varying radiuses of curvature. In other words, a cross section of the engaging surface 121 of each of the engaging keys 12 define a curve which is a curve having varying radiuses of curvature.

(b) Deforming the engaging surface 121 of each of the engaging keys 12 to increase a contacting area S between the engaging surface 121 and the corresponding groove circumference 203 to firmly retain each of the engaging keys 12 at the corresponding groove 201.

According to the preferred embodiment of the present invention, the step (b) further comprises the step of fastening two fastening end portions 113 of the two coupling members by the fastening element 30 to actuate the engaging surface 121 of each of the engaging keys 12 to deform.

Accordingly, the radiuses of curvature of at least a portion of the engaging surface 121 of each of the engaging keys 12 is reduced in the step (b), so as to match the radius of curvature of the groove circumference 203 of the corresponding pipe element 200, so that this portion of the engaging surface 121 of each of the engaging keys 12 is having contact with the groove circumference 203 of the corresponding pipe element 200 when the pipe element coupler 200 is in the assembled state.

In the step (a), the method further comprises the step of forming the gap 103 between the engaging surface 121 of each of the engaging keys 12 and the groove circumference 203 of the corresponding pipe element 200. The step (b) further comprises the step of reducing the gap 103 between the engaging surface 121 of each of the engaging keys 12 and the groove circumference 203 of the corresponding pipe element 200 to direct the engaging surface 121 of each of the engaging keys 12 to attach to the groove circumference 203 of the corresponding pipe element 200.

The step (b) may comprise a step of deforming the engaging surface 121 of each of the engaging keys 12 to form a substantially round curvature which is matched with the radius of curvature of the groove circumference 203 of the corresponding pipe element 200, so as to firmly retain each of the engaging keys 12 at the corresponding groove 201 of the corresponding pipe element 200.

The method further comprises a step of providing a seal between the gasket 40 and the enlarged coupling end portions 202 of the pipe elements 200 by deforming the gasket 40 which is wound around the enlarged coupling end portions 202 of the pipe elements 200 when the fastening element 30 is operated to fasten the fastening end portions 113 of the coupling members 10.

Before step (a), the method further comprises a step of allowing the enlarged coupling end portions 202 of the pipe elements to pass through the opening 102 formed by the two coupling members 10 at the two coupling end portions 100a and 100b thereof without requiring to disassemble the fastening element 30 and the gasket 40 from the coupling members 10.

The present invention actually further provides a method for coupling the pipe elements 200 by the pipe element coupler 100 for facilitating the quick operation of the operator. More specifically, the method comprises the following steps:

(A) Sleeving a first coupling end portion 100a of the pipe element coupler 100 on the enlarged coupling end portion 202 of a first pipe element 210, and inserting the enlarged coupling end portion 202 of the second pipe element 200 into the second coupling end portion 100b of the pipe element coupler 100 in such a manner that each of the engaging keys 12 of the coupling members 10 of the pipe element coupler 100 is aligned with the corresponding groove 201 of the first and second pipe elements 210 and 220, wherein the engaging surface 121 of each of the engaging keys 12 has varying radiuses of curvature, wherein the gap 103 is defined between engaging surface 121 of each of the engaging keys 12 and the groove circumference 203 at the bottom of the groove 201 of the corresponding pipe element 210 or 220.

(B) Operating on the fastening element 30 to fasten two fastening end portions of the coupling members 10 to reduce the gap 103 between the engaging surface 121 of each of the engaging keys 12 and the groove circumference 203 at the bottom of the groove 201 of the corresponding pipe element 210 or 220, so as to retain the engaging keys 12 at the corresponding grooves 201, so that the pipe element coupler 100 is firmly assembled with the first and second pipe elements 210 and 220.

When assembling the enlarged coupling end portion 202 of the first pipe element 210 in the first coupling end portion 100a of the pipe element coupler 100, the operator may use his or her one or more fullers to press on the opposed second coupling end portion 100b of the pipe element coupler 100 to prevent unwanted movement of the pipe element coupler 100 and allow the enlarged coupling end portion 202 of the first pipe element 210 to be sleeved in the gasket 40, so as to facilitate the assembling operation.

Referring to FIG. 16 to FIG. 19 of the drawings, a pipe element coupler 100 according to a second preferred embodiment of the present invention is illustrated. The pipe element coupler 100 comprises three coupling members 10, two pivotally connecting elements 20 pivotally connecting the three coupling members 10 for allowing the adjacent two coupling members 10 to pivotally move with respect to each other, a fastening element 30 for fastening the coupling members 10 after the pipe element coupler 100 is installed on the two pipe elements 200, and a gasket 40 disposed in the three coupling members 10.

Accordingly, in this preferred embodiment, the three coupling members 10 can be coupled with each other to form a substantially loop structure defining an inner cavity. More specifically, the three coupling members 10 comprises a first coupling member 10A, a second coupling member 10B and a third coupling member 10C. The two pivotally connecting elements 20 comprises a first pivotally connecting element 20A and a second pivotally connecting element 20B. The first pivotally connecting element 20A is provided for pivotally connecting the second coupling member 10B with the and the first coupling member 10A, the second pivotally connecting element 20B is provided for pivotally connecting the second coupling member 10B with the and the third coupling member 10C. The fastening element 30 is preassembled with the first and third coupling members 10A and 10C for fastening the first and third coupling members 10A and 10C. The gasket 40 is disposed m the inner cavity 101 formed by the three coupling members 10 for providing a sealing effect when the two pipe elements 200 are assembled with the pipe element coupler 100.

Similarly, the first coupling member 10A comprises a housing body 11A and two engaging keys 12A integrally and inwardly extended from the housing body 11A at two end portions thereof, the first coupling member 10B comprises a housing body 11B and two engaging keys 12B integrally and inwardly extended from the housing body 11B at two end portions thereof, the third coupling member 10C comprises a housing body 11C and two engaging keys 12C integrally and inwardly extended from the housing body 11C at two end portions thereof.

Each of the two pipe elements 200 has a groove 201 adjacent to an enlarged coupling end portion 202 thereof for engaging with the corresponding engaging keys 12A, 12B and 12C of the three coupling members 10.

Accordingly, there is an opening 102 defined between the three engaging keys 12A, 12B and 12C of the three coupling members 10 at each of the two end portions thereof that it is big enough for the corresponding enlarged coupling end portion 202 of one of the two pipe elements 200 to pass therethrough, so that the whole pipe element coupler 100 can be directly installed on the two pipe elements 200 without requiring to disassemble the gasket 40 and the fastening element 30.

According to this preferred embodiment of the present invention, the engaging keys 12A, 12B and 12C of the coupling members 10 have engaging surfaces 121A, 121B, and 121C which have varying radiuses of curvature, each of the pipe elements 200 has a groove circumference 203 at a bottom of the corresponding groove 201. When the pipe element coupler 100 of the present invention is preassembled on the pipe elements 200 to align the engaging keys 12A, 12B and 12C with the corresponding grooves 201, the fastening element is operated to firmly fasten the first and third sections 10A and 10C in such a manner that the engaging surfaces 121A, 121B and 121C are deformed and a part of or all of the engaging surfaces 121A, 121B and 121C are attached on the corresponding groove circumference 203.

In other words, each of the engaging surfaces 121A, 121B and 121C of each of the engaging keys 12A, 12B and 12C of the coupling members 10 does not have a fixed radius of curvature, and thus each of the engaging surfaces 121A, 12B and 121C is not a circular surface with a round curvature. The groove circumference 203 of each of the pipe elements 200 has a substantially round curvature. When the pipe element coupler 100 of the present invention is preassembled on the pipe elements 200 to align the engaging keys 12A, 12B and 12C with the corresponding grooves 201, a gap 103A, 103B, 103C is formed between each engaging surface 12A, 12B, 12C and the corresponding groove circumference 203 of each of the pipe elements 200. And then when the fastening element 30 is operated, the gap 103A, 103B, 10C is reduced until each of the engaging surfaces 121A, 121B, 121C is retained at a position that the firmly and stably coupling between the pipe elements 200 with the pipe element coupler 100 is achieved.

According to this preferred embodiment, each of the engaging surfaces 121A, 121B and 121C defines a curve of varying radiuses of curvature which can be but not limited to a logarithmic spiral curve, an archimedes spiral curve, a pascal spiral curve, an ellipse curve, a high power curve and a combination thereof. Accordingly, each of the engaging surfaces 121 does not have a round curvature and thus the gaps 103A, 103B, and 103C are created when each of the engaging keys 12A, 12B and 12C of the pipe element coupler 100 of the present invention is preassembled in the corresponding grooves 201 of the pipe elements 200.

More specifically, the housing body 11A of the first coupling member 10A comprises a body portion 111A, a pivotally connecting end portion 112A and a fastening end portion 113A, the housing body 11B of the second coupling member 10B comprises a body portion 111B, two pivotally connecting end portions 112B, the housing body 11C of the third coupling member 10C comprises a body portion 111C, a pivotally connecting end portion 112C and a fastening end portion 113C. The pivotally connecting element 20A and 20B pivotally connecting the pivotally connecting end portions 112B with the corresponding pivotally connecting end portions 112A of the housing bodies 11A and 11C. The fastening element 30 is mounted to the two fastening end portions 113A and 113C of the housing bodies 11A and 11C for firmly fastening the coupling members 10A, 10B and 10C with each other.

When in the preassembled state, the wo fastening end portions 113A and 113C of the housing bodies 11A and 11C can be spaced apart from each other, and a size of the opening 102 formed between the engaging surfaces 121A, 121B and 121C of the three engaging keys 12A, 12B and 13C is larger than a diameter of the enlarged coupling end portion 202 of each of the two pipe elements 200, and thus the pipe element coupler 100 can be mounted on the pipe elements 200 by sleeving on the enlarged coupling end portion 202 of each of the pipe elements 200. In other word, the enlarged coupling end portion 202 of each of the pipe elements 200 is able to be inserted into the pipe element coupler 100 by passing through the opening 102 between the three engaging surfaces 121A, 121B and 121C.

Figure 17A:
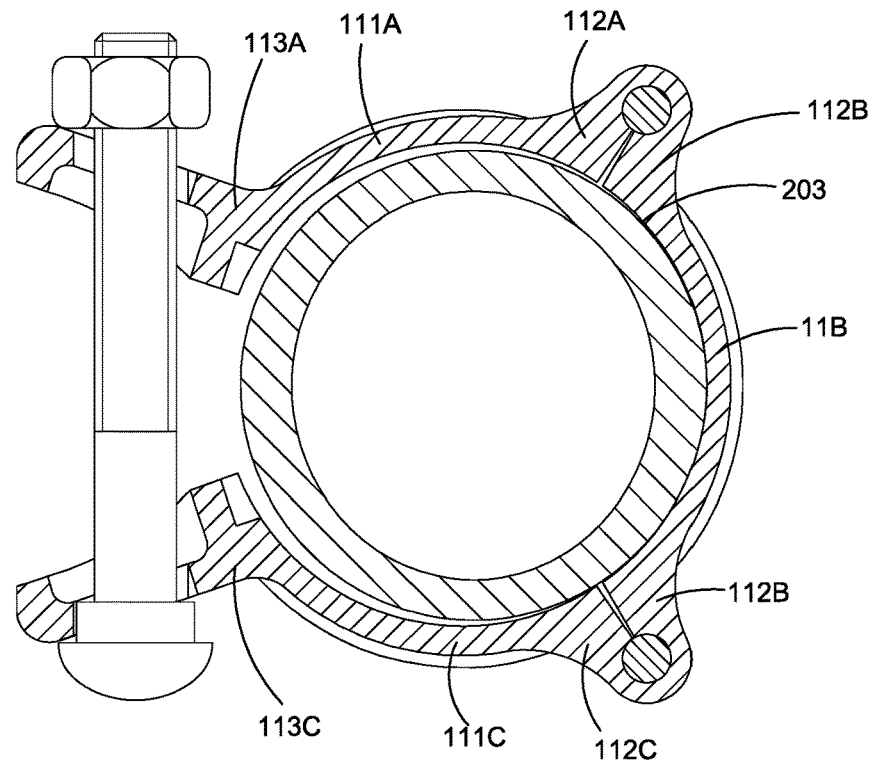
FIG. 17A is a schematic view illustrating the pipe element coupler being preassembled on the pipe elements according to the above second preferred embodiment of the present invention.

Referring to FIG. 17A of the drawings, before installation, the bolt 31 is assembled with the two fastening end portions 113A and 113C and the nut 32 is assembled on the bolt 31. And when the pipe element coupler 100 is able to be installed with the pipe elements 200, the gasket 40 is not required to be detached from the housing bodies 11A and 11C, the bolt 31 and nut 32 are not required to be removed from the two fastening end portions 113A and 113C.

Figure 17B:
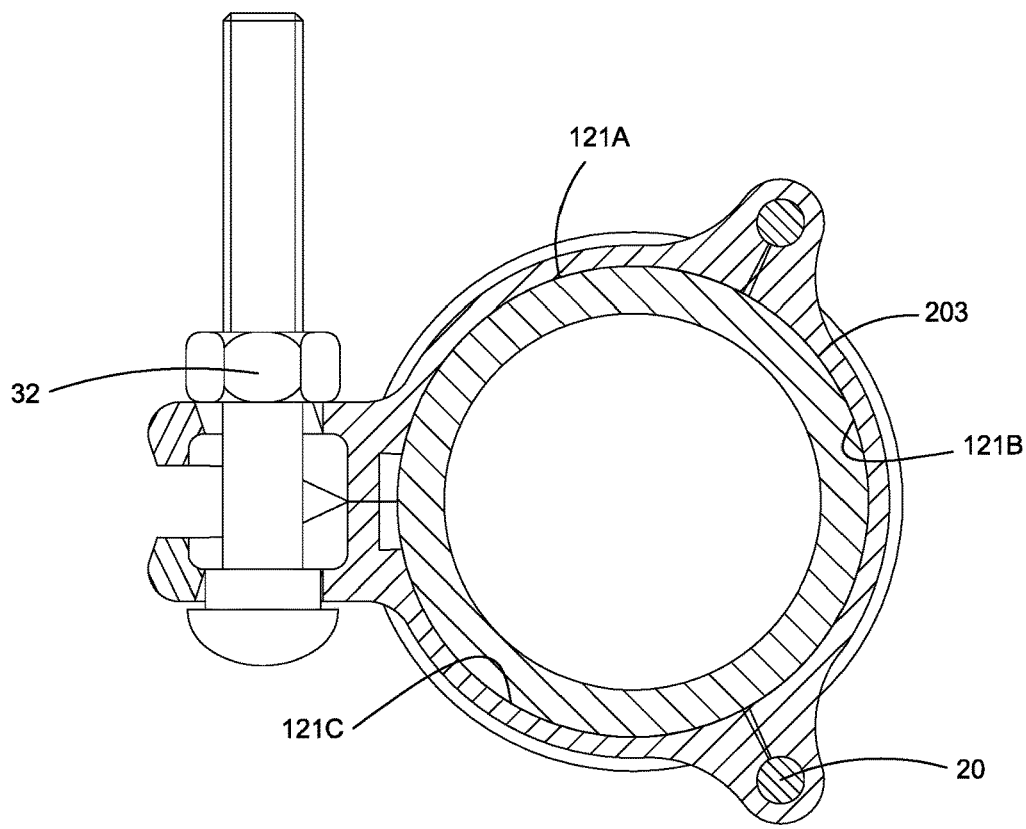
FIG. 17B is a schematic view illustrating the pipe element coupler being firmly assembled on the pipe elements according to the above second preferred embodiment of the present invention.

In other words, two pairs of the tongues each comprises the engaging keys 12A, 12B and 12C form two openings 102 at the two engaging ends of the pipe element coupler 100. Furthermore, the first and third coupling members 10A and 10C are preferred to be constructed to have a same structure. When the bolt 31 and the nut 32 of the fastening element 30 are operated, both of the two pairs of engaging surfaces 12A, 12B and 12C at the two engaging ends thereof are deformed so as to direct the engaging surfaces 121A, 121B and 121C to have contact with the groove circumferences 203 of the pipe elements 200, as shown in FIG. 17B of the drawings.

As a typical example of this preferred embodiment of the present invention, each of the engaging surfaces 121A, 121C defines a logarithmic spiral curve, in other words, a cross section of each of the engaging surfaces 121A and 121C forms a curve which is a logarithmic spiral curve The engaging surface 121B of the second coupling member 10B defines an ellipse curve. When the pipe element coupler 100 is operated from the preassembled state to the final assembled state, the deformation of each of the engaging surfaces 121A, 121B and 121C results in deformed and varied radiuses of curvature thereof, and the variation range thereof is about 13% to 21%. A parameter D' denotes a distance between a middle point 1213B at a middle of the engaging surface 121B and a distal end point 1212A or 1212C, during the tight fastening process of the pipe element coupler 100, the value of parameter D' is gradually reduced, and the variation range of the parameter D' is about 14% to 22%.

Figure 18:
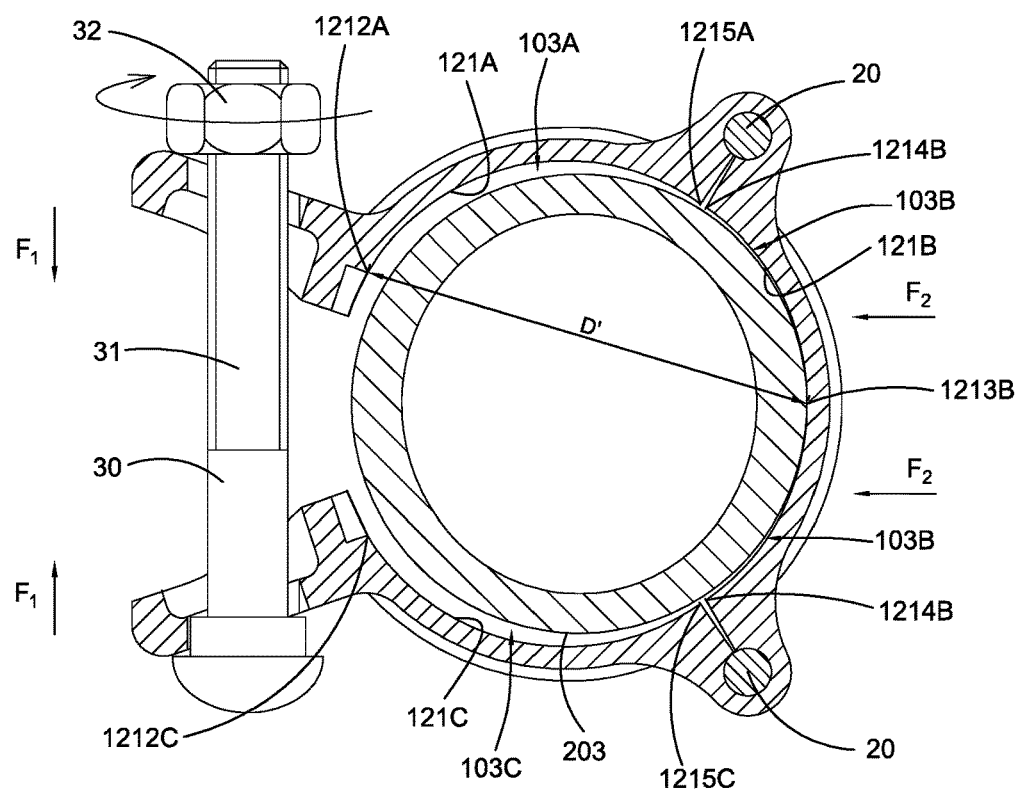
FIG. 18 is a schematic view illustrating the deformation of the engaging surfaces of the pipe element coupler according to the above second preferred embodiment of the present invention.

Referring to FIG. 18 of the drawings, according to this preferred embodiment, the middle point 1213B at the middle of the engaging surface 121B has a smallest radius of curvature that is equal to or slightly larger than (not larger than 5%) the radius of curvature of the groove circumference 203 of each pipe element 200. In other words, the smallest radius of curvature at the middle point 1213B at the middle of the engaging surface 121B is substantially the same as the radius of curvature of the groove circumference 203 of each pipe element 200. Therefore, when the pipe element coupler 100 is preassembled with the pipe elements 200, the surface at the middle point 1213B is attached on the corresponding groove circumference 203. Accordingly, two gaps 103B are formed between the engaging surface 121B and the corresponding groove circumference 103B.

The distal end point 1212A or 1212C adjacent to the fastening end portion 113A or 113C has a largest radius of curvature that can be substantially the radius of curvature of the enlarged coupling end portion 202 of each pipe element 200. Therefore, since the fastening end portions 113A and 113C can be slightly apart from each other when the pipe element 100 is in the preassembled state, the opening 102 defined between the pair of engaging surfaces 121A, 121B and 123C is big enough for the pipe element coupler 100 to be directly sleeved on the pipe elements 200 so as to preassemble the pipe element coupler 100 with the pipe elements 200.

Accordingly, as a preferred example, radiuses of curvatures of the engaging surfaces 121A, 121B and 121C according to this preferred embodiment of the present invention are preferred to be gradually increased from the middle point 1213B to the distal end points 1212A and 1212C.

Referring to FIG. 17B of the drawings, when the fastening element 30 is operated to firmly retain the engaging keys 12A, 12B and 12C at the grooves 201, the gaps 103A, 103B and 103C between the engaging surfaces 121A, 121B and 121C and the groove circumference 203 are reduced, each of the engaging surfaces 121A, 121B and 121C is deformed to change its radiuses of curvature along its circumferential direction to have contact with the groove circumference 203. Each of the deformed engaging surfaces has a substantially round curvature for matching with the radius of curvature of the corresponding groove circumference 203 of each of the pipe elements 200.

When the nut 32 is screwed to move along the bolt 31, a distance between the two fastening end portions 113A and 113C is reduced, the gaps 103A, 103B and 103C are reduced, so that each of the engaging surfaces 121A, 121B and 121C tends to be moved to a position that it is having contact with the groove circumference 203. When in the assembled state, a perimeter of the pair of engaging surfaces 121A, 121B and 121C is substantially equal to or slightly larger than a perimeter of the corresponding groove circumference 203, the pair of engaging surfaces 121A, 121B and 121C form a substantially circular surface having a substantially round curvature matching with the curvature of the corresponding groove circumference 203.

Referring to FIG. 18 of the drawings, when the nut 32 is being rotated to generate a torque, Forces F1 are created along the bolt 31 by the torque, because of existence of the middle point 1213B, Forces F2 are being generated to result in the deformation of the engaging surfaces 121B of the coupling members 10B and also may result in a slight deformation of the engaging surfaces 121A and 121C, the radius of curvature at each of the two end points 1214B of the engaging surface 121B is reduce to be substantial equal to the radius of curvature at the middle point 1213B of the engaging surface 121B which substantially has no deformation during the assembling process. When the torque is gradually increased, the deformation of the coupling members 10A and 10C becomes more apparent, and the deformation is finished until the torque reaches to a predetermined value. The radiuses of curvature at the distal end points 1212A and 1212C have the largest varying ranges, and are reduced to match the radius of curvature of the corresponding groove circumference 203.

Figures 19, 20:
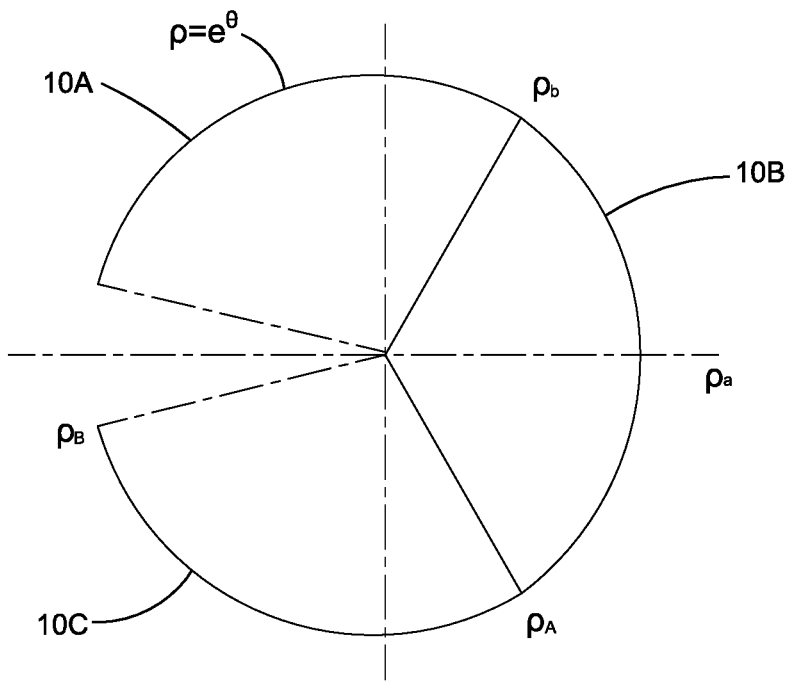
FIG. 19 is a schematic view illustrating varying radiuses of curvature of the pipe element coupler according to the above second preferred embodiment of the present invention.
FIG. 20 illustrates different ranges of θ and values of Da and db for different specifications of the two pipe elements according to the above second preferred embodiment of the present invention.

Referring to FIG. 19 of the drawings, according to a specific example of this preferred embodiment of the present invention, each of the engaging surfaces 121A and 12C defines a logarithmic spiral curve having an equation of $\rho=e^\theta$, wherein $\theta$ has a range of 60-200°. The engaging surface 121B defines an ellipse curve and a value of a minor axis of the ellipse curve Da is the diameter D1 of the groove circumference 203 of the corresponding pipe element 200, a value of a major axis db of the ellipse curve is a value of the specification Sp of the pipe elements plus an allowance R' which has a value range of 0.3-1 mm.

More specifically, FIG. 20 illustrates different ranges of $\theta$ and values of Da and db for different specifications of the two pipe elements 200 which are coupled with each other by the pipe element coupler 100.

According to this preferred embodiment, parameter $\rho_a$ denotes the radius of curvature at the middle point 1213B of the engaging surface 121B, $P_b$ denotes the radius of curvature at each of the two end points 1214B of the engaging surface 121B ($\theta$ is 60°), PA denotes the radius of curvature at each of the proximate end points 1215A and 1215C of the engaging surfaces 121A and 121C, $\rho_B$ denotes the radius of curvature at each of the distal end points 1212A and 1212C of the engaging surface 121A and 121C, D1 denotes the diameter of the groove circumference 203 of each of the pipe elements 200, D2 denotes the diameter of the enlarged coupling end portion 202 of each of the pipe elements 200. Accordingly, $\rho_a=D1/2$, $\rho_b=(Sp+R')/2$, $\rho_A=\rho_b$, and $\rho_B=D2/2$, the radiuses of curvature at the transition points 1214B, 1215A and 1215C are substantially the same.

As a specific example, when the specification of the pipe element coupler 100 is 42.4 mm, the diameter D1 of the groove circumference 203 of each of the pipe elements 200 is 38.99 mm, the diameter D2 of the enlarged coupling end portion 202 of each of the pipe elements 200 is 45 mm, and R is 0.6 mm, then $\rho_a=38.99/2=19.495$ mm, $\rho_A=\text{pb}=20.941$ mm, $\rho_B=45.5/2=22.5$ mm.

Accordingly, the preferred embodiment further provides a method of coupling two pipe elements 200 with the pipe element coupler 100, and the method comprises the following steps:

($\alpha$) Preassembling the pipe element coupler 100 on the two pipe elements in such a manner that the engaging keys 12A, 12B and 12C of the coupling members 10 are respectively aligned with the corresponding groove 201 of the pipe elements 200 and define gaps 103A, 103B and 103C therebetween, wherein each of the engaging surface 121A, 121B and 121C has varying radiuses of curvature.

($\beta$) Assembling the engaging keys 12A, 12B and 12C into the corresponding groove 201 of the pipe elements 200 by operating on the fastening element to reduce the gaps 103A, 103B and 103C, so as to match the radius of curvature of the groove circumference 203 of the corresponding pipe element 200, so that the engaging surfaces 121A, 121B and 121C are substantially having contact with the groove circumference 203 of the corresponding pipe element 200 when the pipe element coupler 200 is in the assembled state.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A combination of a pipe element and a pipe element coupler for coupling two pipe elements each having a groove and a groove circumference at a bottom of the groove, wherein the pipe element coupler comprises:

two coupling members arranged to be coupled end-to-end to define an inner cavity, wherein each of said coupling members comprises two engaging keys extended from two sides thereof respectively and two engaging surfaces defined at said engaging keys respectively, wherein each of said engaging keys has an engaging surface having varying radiuses of curvature;

a gasket disposed in said coupling members within said inner cavity;

a pivotally connecting element pivotally connecting said two coupling members; and a fastening element is mounted at said coupling members to move said coupling members between a preassembled position and an assembled position, wherein each of said engaging surfaces has a proximate end point adjacent to said pivotally connecting element and a distal end point adjacent to said fastening element, wherein said varying radiuses of curvatures of each of said engaging surface are gradually increased from said proximate end point to said distal end point, so as to define a gap gradually increased from said proximate end point to said distal end point between each of said engaging surfaces and the corresponding groove circumference of each of the pipe elements when said coupling members are at said preassembled position in which said coupling members are arranged for encircling the pipe element to align said engaging keys with the grooves respectively, wherein at said assembled position, said coupling members are fastened with each other for engaging said engaging keys with the grooves respectively in such a manner that each of said engaging keys is deformed to self-adjust a curvature thereof and reduce the gap for matching with a curvature of the groove circumference so as to tightly couple said coupling members at the pipe elements to couple the pipe elements end-to-end; wherein each of the pipe elements has an enlarged coupling end portion, wherein said gasket comprises a plurality of protrusions which are spaced apart from each other, wherein said protrusions are adapted for being sandwiched between the two enlarged coupling end portions of the pipe elements; each of said engaging surfaces defines a logarithmic spiral curve having an equation of $\rho=e^{\theta}$, wherein $\rho$ denotes a radius of curvature of the engaging surface, $\theta$ denotes a center angle between said distal end point and said proximate end point, and Sp denotes a dimension of the pipe element wherein the dimension of the pipe element is a diameter of a body portion of the pipe element;

wherein when $S\rho=60.3$ mm, $\theta$ has a range of 0-169.88°;
wherein when $S\rho=73.0$ mm, $\theta$ has a range of 0-170.67°;
wherein when $S\rho=76.1$ mm, $\theta$ has a range of 0-171.23°;
wherein when $S\rho=88.9$ mm, $\theta$ has a range of 0-172.46°;
wherein when $S\rho=108.0$ mm, $\theta$ has a range of 0-173.53°;
wherein when $S\rho=114.3$ mm, $\theta$ has a range of 0-173.92°;
wherein when $S\rho=133.0$ mm, $\theta$ has a range of 0-174.84°;
wherein when $S\rho=139.7$ mm, $\theta$ has a range of 0-175.02°;
wherein when $S\rho=141.3$ mm, $\theta$ has a range of 0-175.05°;
wherein when $S\rho=159.0$ mm, $\theta$ has a range of 0-175.57°;
wherein when $S\rho=165.1$ mm, $\theta$ has a range of 0-175.68°;
wherein when $S\rho=168.3$ mm, $\theta$ has a range of 0-175.76°;
wherein when $S\rho=216.3$ mm, $\theta$ has a range of 0-175.42°;
wherein when $S\rho=219.1$ mm, $\theta$ has a range of 0-175.47°.

2. The combination of a pipe element and a pipe element coupler, as recited in claim 1, wherein each of said engaging surfaces of said two coupling members defines a curve of varying radiuses of curvature which is a logarithmic spiral curve.

3. The combination of a pipe element and a pipe element coupler, as recited in claim 1, wherein a radius of curvature at said distal end point of each of said engaging surfaces is not less than a radius of curvature of the enlarged coupling end portion.

4. The combination of a pipe element and a pipe element coupler, as recited in claim 1, wherein $\rho_1$ denotes said radius curvature at said proximate end point, $\rho_2$ denote a radius curvature at said distal end point, D1 denotes a diameter of the groove circumference, D2 denotes a diameter of the enlarged coupling end portion, wherein $\rho_1=D1/2$, $\rho_2=D2/2+R$, wherein R is an additional allowance for parameter $\rho_2$ and has a value range of 0.3-1 mm.

5. The combination of a pipe element and a pipe element coupler, as recited in claim 1, wherein the deformation of each of said engaging surfaces results in deformed and varied radiuses of curvature thereof, wherein a variation range thereof is 4.5% to 12%.

6. The combination of a pipe element and a pipe element coupler, as recited in claim 1, wherein D denotes a distance between said proximate end point and said distal end point, wherein the deformation of each of said engaging surfaces results in variation of D, wherein a variation range thereof is 4% to 15%.

7. A combination of a pipe element and a pipe element coupler for coupling two pipe elements each having a groove and a groove circumference at a bottom of the groove, wherein the pipe element coupler comprises:

a plurality of coupling members, wherein each of said coupling members comprises two engaging keys at two coupling end portions thereof, wherein each of said engaging keys has an engaging surface having varying radiuses of curvature; a gasket disposed in said coupling members; and a fastening element mounted on said coupling members, wherein said pipe element coupler is adapted for being preassembled on the two pipe elements to align said engaging keys with the corresponding grooves, wherein when said fastening element is operated to fasten said coupling members together, each of said engaging surfaces is deformed to change said varying radiuses of curvature, so as to substantially match a radius of curvature of the groove circumference; said plurality of coupling members comprises two coupling members, wherein said pipe element coupler further comprises a pivotally connecting element pivotally connecting said two coupling members, wherein said pivotally connecting element and said fastening element are respectively assembled on two opposite sides of the two coupling members; each of the two pipe element further comprises an enlarged coupling end portion, wherein each of said engaging surfaces defines a logarithmic spiral curve having an equation of $\rho=e^{\theta}$, wherein $\theta$ has a range of 0-180°, wherein $\rho$ denotes a radius of curvature of the engaging surface, and $\theta$ denotes a center angle between said distal end point and said proximate end point, wherein $\rho_1$ denotes said radius curvature at said proximate end point, $\rho_2$ denote a radius curvature at said distal end point, D1 denotes a diameter of the groove circumference, D2 denotes a diameter of the enlarged coupling end portion, wherein $\rho_1=D1/2$, $\rho_2=D2/2+R$, wherein R is an additional allowance for parameter $\rho_2$ and has a value range of 0.3-1 mm;

wherein said gasket comprises a plurality of protrusions which are spaced apart from each other, wherein said protrusions are adapted for being sandwiched between the two enlarged coupling end portions of the pipe elements.

8. The combination of a pipe element and a pipe element coupler, as recited in claim 7, wherein each of the two coupling members comprises a housing body and a fastening end portion, which is integrally extended from said housing body, mounted with said fastening element.

9. The combination of a pipe element and a pipe element coupler, as recited in claim 8, wherein each of said engaging surfaces of said two coupling members defines a curve of varying radiuses of curvature which is the logarithmic spiral curve.

10. The combination of a pipe element and a pipe element coupler, as recited in claim 8, wherein the deformation of each of said engaging surfaces results in deformed and varied radiuses of curvature thereof, wherein a variation range thereof is 4.5% to 12%.

11. The combination of a pipe element and a pipe element coupler, as recited in claim 7, wherein each of said engaging surfaces has a proximate end point adjacent to said pivotally connecting element and a distal end point adjacent to said fastening element, wherein D denotes a distance between said proximate end point and said distal end point, wherein the deformation of each of said engaging surfaces results in variation of D, wherein a variation range thereof is 4% to 15%.

12. The combination of a pipe element and a pipe element coupler, as recited in claim 7, wherein said plurality of coupling members comprises a first coupling member, a second coupling member, and a third coupling member, wherein said pipe element coupler further comprises a first pivotally connecting element pivotally connecting said first coupling member and said second coupling member, and a second pivotally connecting element pivotally connecting said third coupling member and said second coupling member, wherein said fastening element is mounted with said first coupling member and said third coupling member.

13. The combination of a pipe element and a pipe element coupler, as recited in claim 12, wherein said engaging surface of said second coupling member has a middle point which has a smallest radius of curvature which is substantially the same as a radius of curvature of the groove circumference.

14. A coupling method for coupling two pipe elements by a pipe element coupler, comprising the following steps:
  (A) sleeving a first coupling end portion of said pipe element coupler on an enlarged coupling end portion of a first pipe element of the two pipe elements, and inserting an enlarged coupling end portion of a second pipe element of the two pipe elements into a second coupling end portion of said pipe element coupler in such a manner that engaging keys of a plurality of coupling members are respectively aligned with the corresponding grooves of the first and second pipe elements, sandwiching a plurality of protrusions of a gasket between the two enlarged coupling end portions of the pipe elements, wherein said engaging surface of each of said engaging keys has varying radiuses of curvature, wherein a gap is defined between said engaging surface and a corresponding groove circumference at a bottom of the groove; and
  (B) reducing said gap between said engaging surface and the corresponding groove circumference by fastening two fastening end portions of said coupling members through said fastening element, so as to retain said engaging keys at the corresponding grooves; each of said engaging surfaces defines a logarithmic spiral curve having an equation of $\rho=e^\theta$, wherein $\rho$ denotes a radius of curvature of the engaging surface, $\theta$ denotes a center angle between said distal end point and said proximate end point and Sp denotes a dimension of the pipe element;
  wherein when $S\rho=60.3$ mm, $\theta$ has a range of 0-169.88°;
  wherein when $S\rho=73.0$ mm, $\theta$ has a range of 0-170.67°;
  wherein when $S\rho=76.1$ mm, $\theta$ has a range of 0-171.23°;
  wherein when $S\rho=88.9$ mm, $\theta$ has a range of 0-172.46°;
  wherein when $S\rho=108.0$ mm, $\theta$ has a range of 0-173.53°;
  wherein when $S\rho=114.3$ mm, $\theta$ has a range of 0-173.92°;
  wherein when $S\rho=133.0$ mm, $\theta$ has a range of 0-174.84°;
  wherein when $S\rho=139.7$ mm, $\theta$ has a range of 0-175.02°;
  wherein when $S\rho=141.3$ mm, $\theta$ has a range of 0-175.05°;
  wherein when $S\rho=159.0$ mm, $\theta$ has a range of 0-175.57°;
  wherein when $S\rho=165.1$ mm, $\theta$ has a range of 0-175.68°;
  wherein when $S\rho=168.3$ mm, $\theta$ has a range of 0-175.76°;
  wherein when $S\rho=216.3$ mm, $\theta$ has a range of 0-175.42°;
  wherein when $S\rho=219.1$ mm, $\theta$ has a range of 0-175.47°.

15. The method, as recited in claim 14, wherein each of said engaging surfaces has a proximate end point adjacent to said pivotally connecting element and a distal end point adjacent to said fastening element, wherein said varying radiuses of curvatures of each of said engaging surface are gradually increased from said proximate end point to said distal end point, so as to define said gap gradually increased from said proximate end point to said distal end point between each of said engaging surfaces and the corresponding groove circumference of each of the pipe elements when said coupling members is at a preassembled position in which said coupling members are arranged for encircling the pipe element to align said engaging keys with the grooves respectively.

16. The method, as recited in claim 15, wherein $\rho_1$ denotes said radius curvature at said proximate end point, $\rho_2$ denote a radius curvature at said distal end point, D1 denotes a diameter of the groove circumference, D2 denotes a diameter of the enlarged coupling end portion, wherein $\rho_1=D1/2$, $\rho_2=D2/2+R$, wherein R is an additional allowance for parameter $\rho_2$ and has a value range of 0.3-1 mm.

17. The method, as recited in claim 15, wherein D denotes a distance between said proximate end point and said distal end point, wherein the deformation of each of said engaging surfaces results in variation of D, wherein a variation range thereof is 4% to 15%.

18. The method, as recited in claim 14, wherein each of said engaging surfaces of said two coupling members defines a curve of varying radiuses of curvature which is the logarithmic spiral curve.

19. The method, as recited in claim 14, wherein the deformation of each of said engaging surfaces results in deformed and varied radiuses of curvature thereof, wherein a variation range thereof is 4.5% to 12%.

20. The method, as recited in claim 14, wherein when assembling the enlarged coupling end portion of the first pipe element in said first coupling end portion of said pipe element coupler, the method further comprises a step of pressing on the opposed second coupling end portion of said pipe element coupler to prevent unwanted movement of said pipe element coupler and allow the enlarged coupling end portion of the first pipe element to be sleeved in a gasket.

* * * * *